(12) United States Patent
Horikoshi

(10) Patent No.: US 6,659,580 B2
(45) Date of Patent: *Dec. 9, 2003

(54) PRINTING APPARATUS, CONTROL METHOD THEREFOR, AND COMPUTER-READABLE MEMORY

(75) Inventor: Hiroki Horikoshi, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/356,464

(22) Filed: Jul. 19, 1999

(65) Prior Publication Data

US 2003/0043227 A1 Mar. 6, 2003

(30) Foreign Application Priority Data

| Jul. 22, 1998 | (JP) | ............................................. 10-206611 |
| Jul. 9, 1999 | (JP) | ............................................. 11-196183 |

(51) Int. Cl.⁷ .......................... B41J 29/38; B41J 29/393
(52) U.S. Cl. ................................. 347/9; 347/14; 347/19
(58) Field of Search .......................... 347/5, 9, 14, 19, 347/15, 41

(56) References Cited

U.S. PATENT DOCUMENTS

| 4,313,124 A | 1/1982 | Hara ............................ 347/57 |
| 4,345,262 A | 8/1982 | Shirato et al. ................. 347/16 |
| 4,459,600 A | 7/1984 | Sato et al. ..................... 347/47 |
| 4,463,359 A | 7/1984 | Ayata et al. ................... 347/56 |
| 4,558,333 A | 12/1985 | Sugitani et al. ............... 347/65 |
| 4,608,577 A | 8/1986 | Hori ............................. 347/66 |
| 4,723,129 A | 2/1988 | Endo et al. .................... 347/56 |
| 4,740,796 A | 4/1988 | Endo et al. .................... 347/56 |
| 4,963,882 A | * 10/1990 | Hickman ...................... 347/41 |
| 5,124,720 A | 6/1992 | Schantz ........................ 347/19 |
| 5,831,642 A | * 11/1998 | Matsubara et al. ............ 347/9 |
| 5,847,723 A | 12/1998 | Akahira et al. ................ 347/14 |
| 5,992,962 A | * 11/1999 | Ven et al. ...................... 347/9 |
| 6,089,695 A | * 7/2000 | Takagi et al. .................. 347/40 |
| 6,283,572 B1 | * 9/2001 | Kamar et al. .................. 347/19 |
| 6,302,511 B1 | 10/2001 | Neese et al. ................... 347/19 |
| 6,347,855 B1 | 2/2002 | Takanaka ...................... 347/19 |
| 6,398,342 B1 | 6/2002 | Neese et al. ................... 347/40 |

FOREIGN PATENT DOCUMENTS

| EP | 0783973 A2 | 7/1997 | ............ B41J/2/205 |
| JP | 54-56847 | 5/1979 | ............ B41M/5/26 |
| JP | 59-123670 | 7/1984 | ............ B41J/3/04 |
| JP | 59-138461 | 8/1984 | ............ B41J/3/04 |
| JP | 60-71260 | 4/1985 | ............ B41J/3/04 |
| JP | 62-53492 | 3/1987 | ............ D06P/5/22 |
| JP | 3-46589 | 2/1991 | ............ G01S/17/08 |
| JP | 4-128052 | 4/1992 | ............ B41J/2/205 |
| JP | 5-301427 | 11/1993 | ............ B41J/29/46 |
| JP | 6-79956 | 3/1994 | ............ B41J/29/46 |
| JP | 8-25700 | 1/1996 | ............ B41J/2/51 |

* cited by examiner

Primary Examiner—Stephen D. Meier
Assistant Examiner—Alfred E Dudding
(74) Attorney, Agent, or Firm—Fitzpatrick, Cella, Harper & Scinto

(57) ABSTRACT

A table generator generates a mask table for outputting print data corresponding to each of a plurality of scanning operations. A mask processing unit changes the contents of the generated mask table on the basis of a non-discharge orifice among a plurality of orifices. Print data corresponding to the plurality of orifices in each of a plurality of scanning operations is output based on image information about an image to be printed using the generated or changed mask table.

13 Claims, 24 Drawing Sheets

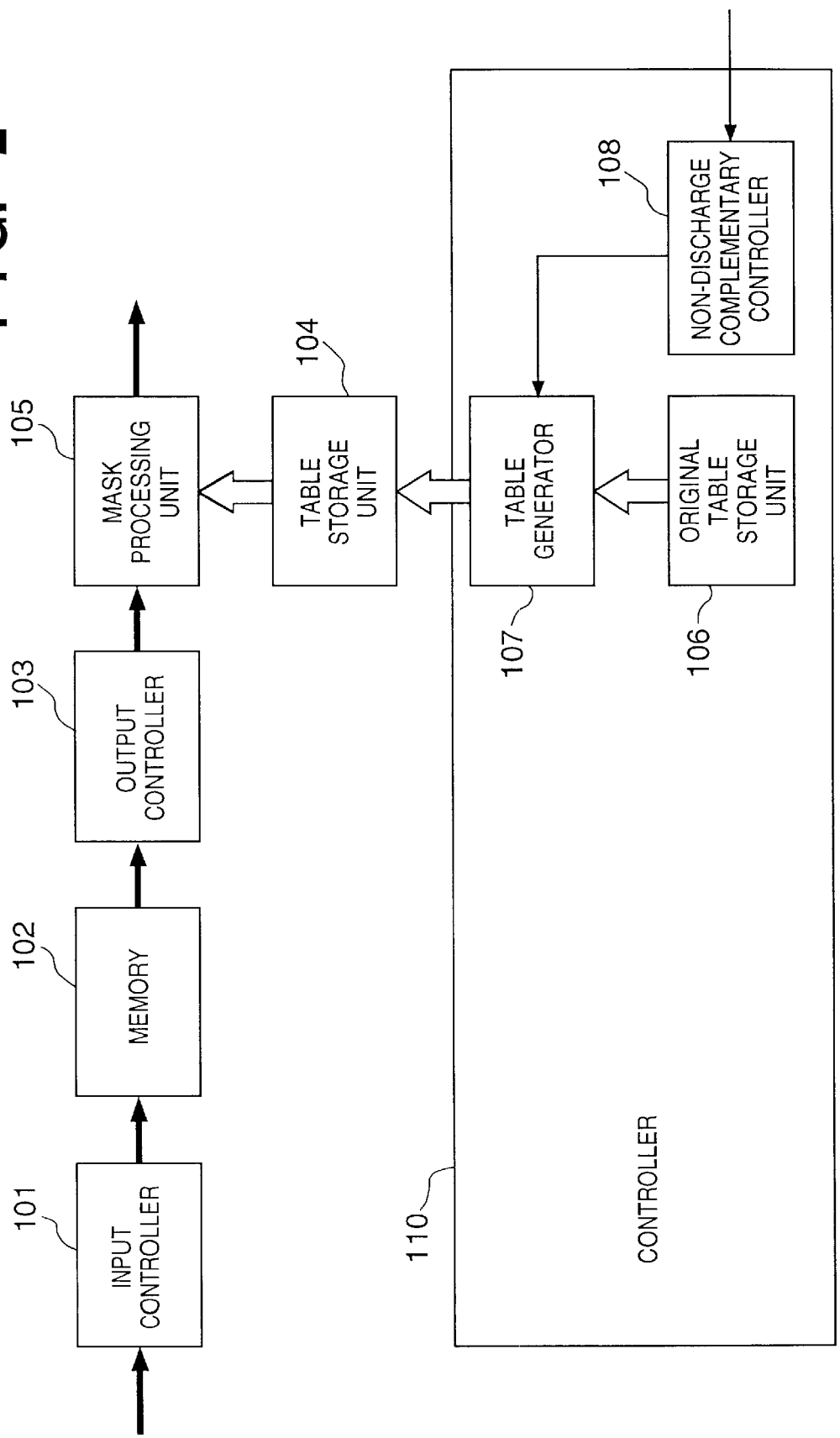

FIG. 3A

| | 1024 | NOZZLE NUMBER |
|---|---|---|
| A | 0100010010001......<br>1000010000100......<br>0001001000010......<br>0000100100001......<br>0001001000000......<br>0010000110001......<br>............<br>............ | #0 <br><br> 16 <br><br> #15 |

FIG. 3B

| | 1024 | |
|---|---|---|
| B | 1001000001000......<br>0010000010010......<br>0000110000001......<br>0100010000100......<br>0100000101010......<br>0001001000010......<br>............<br>............ | #16 <br><br> 16 <br><br> #31 |

FIG. 3C

| | 1024 | |
|---|---|---|
| C | 0000100100010......<br>0100101000001......<br>1000000100100......<br>0001000011000......<br>1000010000001......<br>0000100001000......<br>............<br>............ | #32 <br><br> 16 <br><br> #47 |

FIG. 3D

| | 1024 | |
|---|---|---|
| D | 0010001000100......<br>0001000101000......<br>0110000011000......<br>1010001000010......<br>0010100010100......<br>1100010000100......<br>............<br>............ | #48 <br><br> 16 <br><br> #63 |

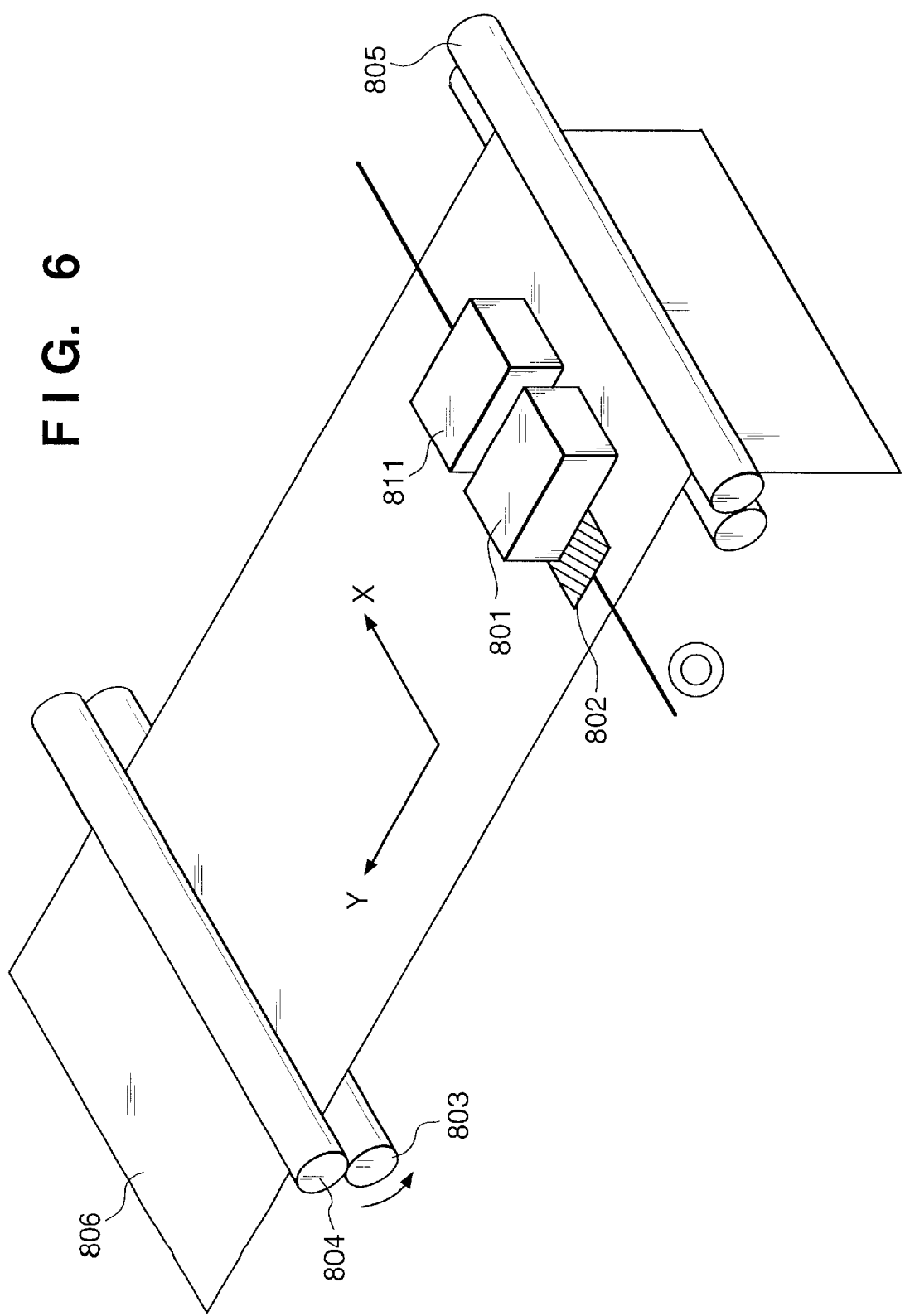

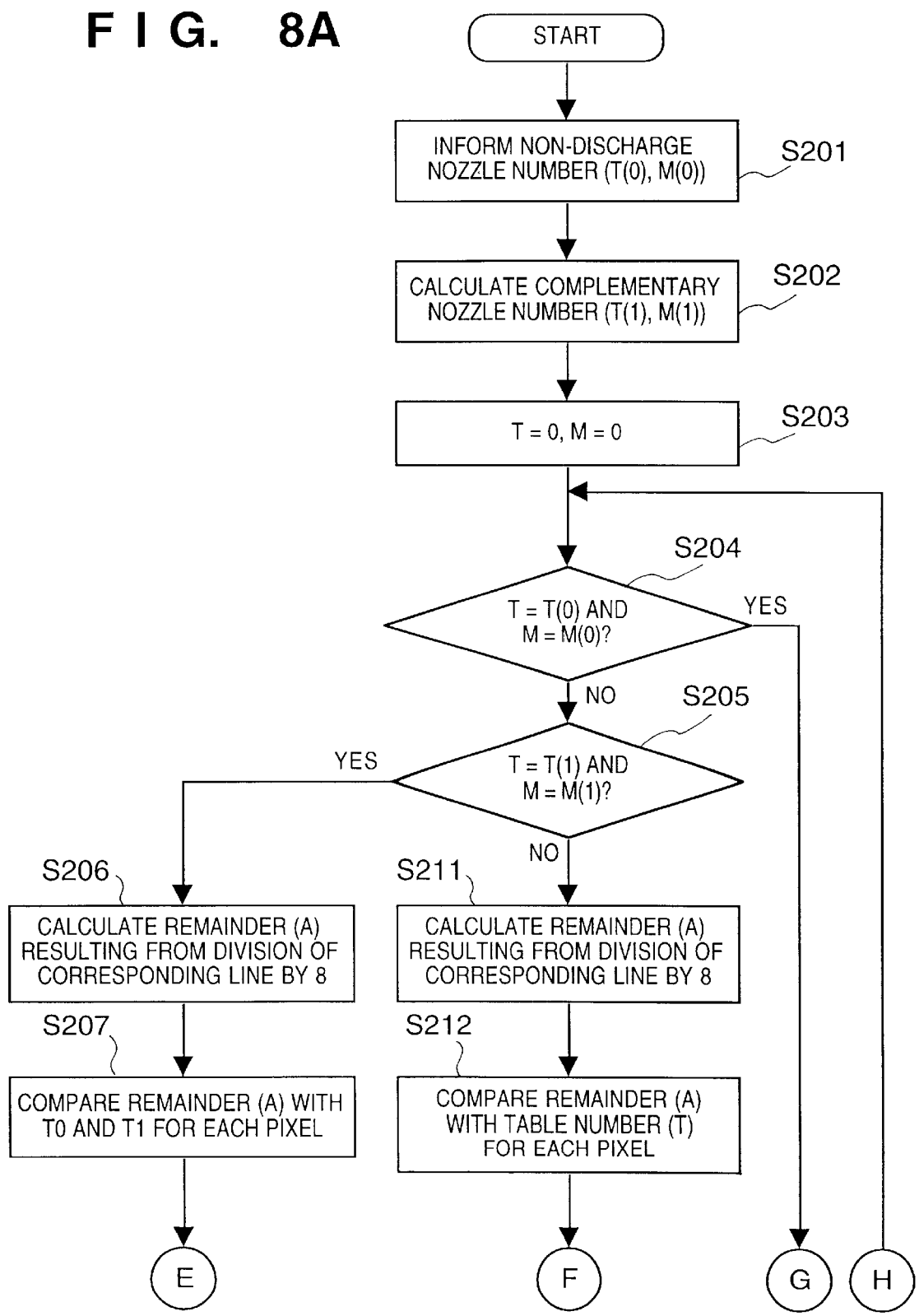

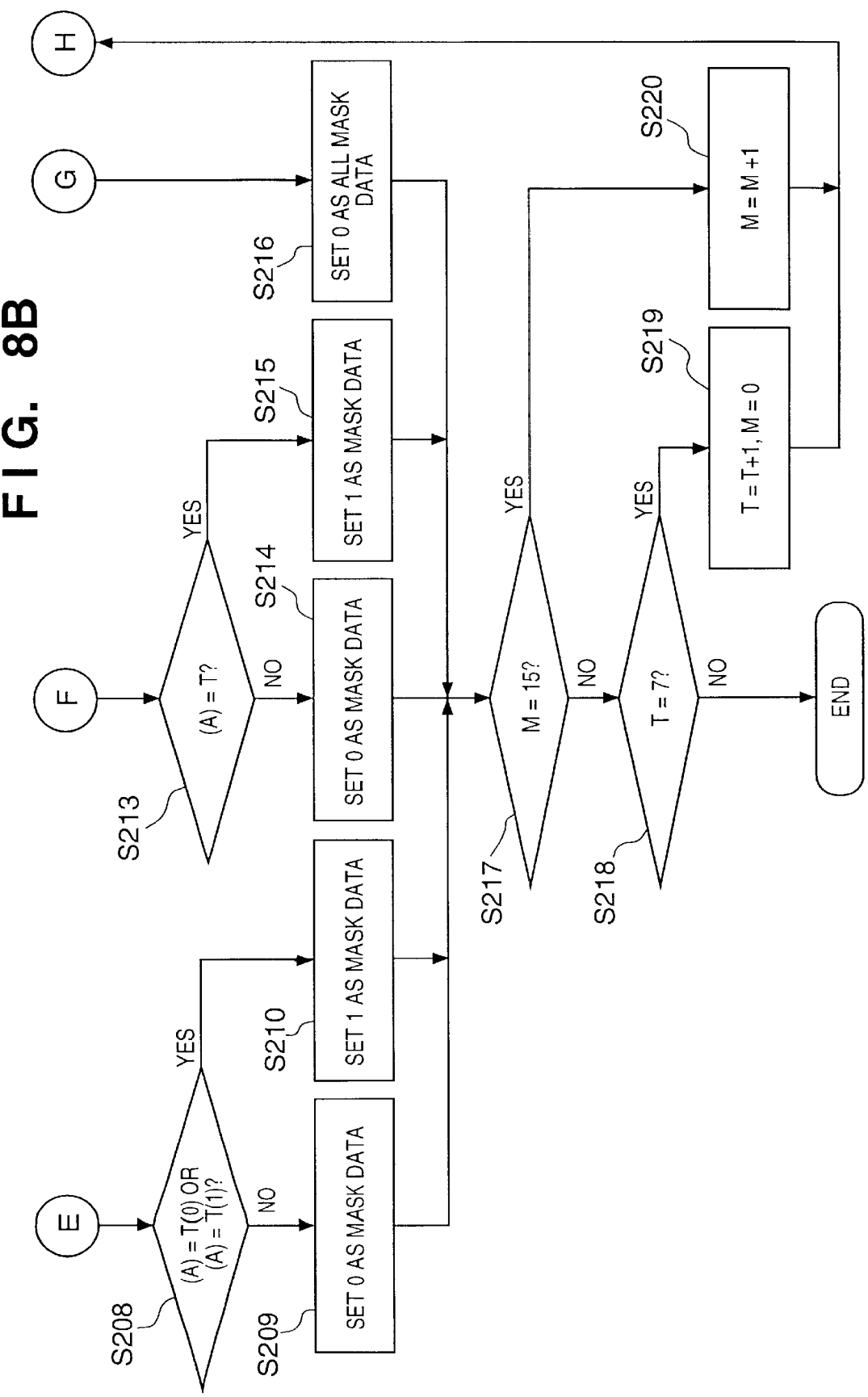

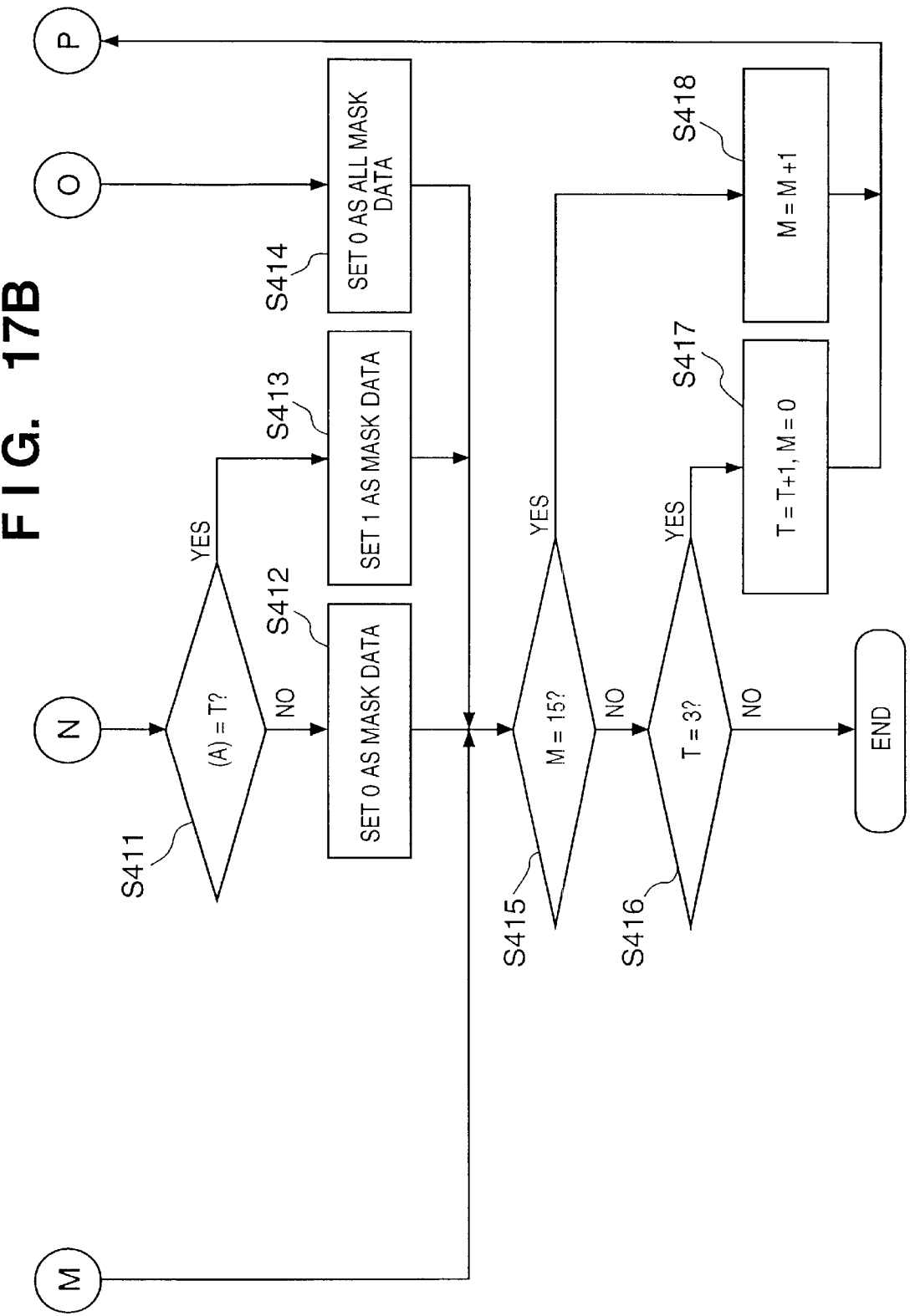

PRINTING APPARATUS, CONTROL METHOD THEREFOR, AND COMPUTER-READABLE MEMORY

BACKGROUND OF THE INVENTION

1. Field of the Invention

The present invention relates to a printing apparatus which performs multipath printing of scanning a plurality of number of times the same printing area of a printing medium with a printhead having a plurality of orifices arranged in a printing medium convey direction, thereby forming an image based on input image information on the printing medium, a control method therefor, and a computer-readable memory.

2. Description of the Related Art

In resent years, OA devices such as personal computers, copying machines, and wordprocessors have become popular. As a kind of printing apparatus for these devices, inkjet printing apparatuses for printing an image by an inkjet printing method are rapidly developed and popularized. With advanced functions of OA devices, color images are required, and various color inkjet printing apparatuses are being developed.

In general, the inkjet printing apparatus comprises a printing means (printhead), a carriage for mounting an ink tank, a convey means for conveying a printing sheet, and a control means for controlling them. A printhead for discharging ink droplets from a plurality of orifices is scanned in a direction (to be referred to as a main scanning direction) perpendicular to the convey direction (to be referred to as a subscanning direction) of a printing sheet. In non-printing, a printing sheet is intermittently conveyed along said subscanning direction by an amount equal to a printing width. A color inkjet printing apparatus forms a color image by overlapping ink droplets discharged from printheads of a plurality of colors on a printing medium.

Examples of the method of printing an image by discharging ink in the inkjet printing apparatus are a method using an electrothermal energy converter in which a heating element (electrothermal energy converter) is disposed near an orifice and an electrical signal is applied to the heating element to locally heat ink and change the pressure, thereby discharging ink from the orifice, and a method using an electro-mechanical converter such as a piezoelectric element. A known example of the means of discharging ink is an arrangement using an electro-pressure conversion means, such as a piezoelectric element, to apply a mechanical pressure to ink, thereby discharging the ink.

These methods print characters and figures by discharging small ink droplets from an orifice onto a printing medium in accordance with print data. The inkjet printing apparatus hardly generates noise because of a non-impact type, can reduce the running cost and apparatus size, and can relatively easily print a color image. With these advantages, the inkjet printing apparatus is employed in a computer, wordprocessor, and the like. Further, the inkjet printing apparatus is widely used as a printing apparatus mounted on a stand-alone copying machine, printer, facsimile, and the like.

In the printing method of the conventional inkjet printing apparatus, a dedicated coated sheet having an ink absorption layer must be used to obtain a high-development color image free from any ink blur on a printing medium. Recent improvements of ink and the like allow practically using a method having printability on plain sheets which are enormously consumed in a printer, copying machine, and the like. In addition, demands arise to cope with various printing media having different ink absorption characteristics, such as an OHP sheet, cloth, and plastic sheet. To meet these demands, printing apparatuses capable of performing best printing regardless of the type of printing medium are being developed and put into practical use. As for the size of a printing medium, demands arise for printing on a large-size printing medium such as printing on an advertising poster, cloth such as clothes, and the like. Such inkjet printing apparatus is being demanded as an excellent printing means in various industrial fields. Higher image qualities and higher speeds are also being required.

In general, the printing method of the color inkjet printing apparatus realizes color printing using three, cyan (Cy), magenta (Mg), and yellow (Ye) color inks or four color inks including a black (Bk) ink. This color inkjet printing apparatus prints a color image, unlike a monochrome inkjet printing apparatus mainly used to print characters, and is required for various factors such as the color development, gradation, and uniformity of an image to be printed.

However, the quality of an image to be printed greatly depends on the performance of the printhead itself. That is, slight differences between orifices caused in manufacturing the printhead, such as variations in shapes of the orifices of the printhead or electrothermal converters (discharge heaters), influence the discharge amount and direction of discharged ink, resulting in low image quality as density nonuniformity of a final printed image. Consequently, a "blank" portion which inhibits an area factor of 100% periodically appears in the main scanning direction, dots excessively overlap each other, or a blank stripe appears on a printing medium. These phenomena are sensed as density nonuniformity by a human eye.

To prevent this density nonuniformity, a multipath printing method is proposed. This multipath printing method will be described with reference to FIG. 11.

In FIG. 11, a multipath printing method using a printhead of a single ink color having eight nozzles (orifices) will be exemplified for descriptive convenience.

FIG. 11 is a view for explaining the multipath printing method.

In the first scanning of the printhead in the main scanning direction, a staggered pattern (a pattern to be printed at ● positions) is printed using first four nozzles out of the eight nozzles of the printhead. The printing sheet is fed in the subscanning direction by half the printing width of the printhead (by a width of 4 dots in this case). Then, in the second scanning of the printhead, an inverted staggered pattern (a pattern to be printed at ○ positions) is printed using all the eight nozzles of the printhead to complete printing in a printing area corresponding to half the printing width of the printhead. That is, a 4-dot wide printing area is completed every scanning by sequentially feeding the printing sheet in units of 4 dots and alternately printing staggered and inverted staggered patterns. In this way, one line (printing area by one scanning with the printing width of the printhead) is printed using two different nozzles, thereby forming a high-quality image almost free from density nonuniformity. Also, the multipath printing method can perform printing while drying ink.

Known examples of a method of generating data (path data) not to be printed (not to discharge ink) in each scanning are a method (fixed thinning method) of generating path data by thinning out print data using a staggered/inverted staggered pattern, as described above, a method (random thinning method) of generating path data by thinning out print data using a random mask pattern prepared by laying out print dots and non-print dots at random, and a method (data thinning method) of generating path data by thinning out print dots.

If the printhead of the inkjet printing apparatus does not discharge any ink for a long time, the ink viscosity increases in the ink passage near the orifice, failing in normal discharge. If printing operation having a high print dot ratio (high printing duty) continues, small bubbles are produced in ink in the ink passage along with ink discharge, and grow and remain in the ink passage to influence discharge, failing in normal discharge. In addition to these bubbles produced with ink discharge, bubbles may be mixed in ink in an ink supply system such as the interconnection of an ink supply path.

This ink discharge error degrades reliability of the printing apparatus. If printing continues in an erroneous discharge state, the printhead temperature rises to a higher level than a normal level to damage the printhead itself and deteriorate the durability.

To avoid an ink discharge error caused by various factors, the inkjet printing apparatus adopts recovery processing such as ① capping processing of capping the orifice surface of the printhead in a non-discharge state to prevent an increase in ink viscosity, ② ink suction processing of sucking ink from the orifice in a capped state to forcibly discharge high-viscosity ink, and ③ pre-discharge processing of discharging ink to a predetermined ink receiver formed from an ink absorber or the like to discharge high-viscosity ink.

The inkjet printing apparatus preferably comprises a detection means for detecting an ink discharge error in association with recovery processing in order to improve the reliability of the printing apparatus. The detection means preferably individually detects a discharge error for a plurality of orifices of the printhead. As the detection means, various methods are employed: a method using a photosensor disposed on an ink flying path, a method of determining an ink discharge error by a temperature rise and subsequent temperature drop of the printhead caused by no-ink discharge, and a method of detecting an ink discharge error by printing a predetermined test pattern on a printing medium and reading out the printed pattern.

However, the conventional printing apparatus suffers the following problems in association with measures against an ink discharge error.

When an ink discharge error is detected during page printing, recovery processing is generally immediately executed. Recovery processing is done while interrupting printing processing, which prolongs the total printing processing time. In an inkjet printing apparatus for performing multipath printing, the time interval between a plurality of printing scanning operations for the same printing area becomes longer than normal printing scanning by a time required for recovery processing. In general, a subsequently landed ink droplet penetrates in directions perpendicular to and along the sheet surface, but rarely penetrates and fixes in an area where a previously landed ink droplet has penetrated. The subsequent ink droplet penetrates and fixes below the area where the previous ink droplet has penetrated. However, when a next ink droplet is landed a long time interval after previous printing scanning, the next ink droplet penetrates by a relatively large amount in an area where a previous ink droplet has penetrated and fixed. Thus, the printing density becomes high when the time interval of printing scanning is long. As a result, the density may become nonuniform in an area where the time interval of printing is long due to recovery processing. In addition, ink suction processing particularly consumes a large amount of ink, so it is not preferable to frequently perform recovery processing.

If normal ink discharge cannot be resumed even by recovery processing and the printhead fails, the printhead must be exchanged with a new one capable of normal operation. Until the printhead is exchanged, density nonuniformity or a blank stripe caused by an ink discharge error must be permitted, or the printing function itself must be completely stopped.

To solve these problems arising from an ink discharge error, the printhead may be equipped in advance with, e.g., a nozzle not used in normal printing, and when a non-discharge nozzle is detected, the prepared complementary nozzle complementarily prints instead of the non-discharge nozzle. However, a spare nozzle provided to the printhead inhibits downsizing of the printhead and increases the cost of the printhead as expendables.

SUMMARY OF THE INVENTION

The present invention has been made to eliminate the above drawbacks, and has as its object to provide a printing apparatus capable of suppressing an increase in total printing time caused by recovery processing during printing and forming a high-quality image free from density nonuniformity, a control method therefor, and a computer-readable memory.

To achieve the above object, a printing apparatus according to the present invention comprises the following arrangement.

That is, a printing apparatus which performs multipath printing of scanning a plurality of number of times the same printing area of a printing medium with a printhead having a plurality of orifices arranged in a printing medium convey direction, thereby completing an image based on input image information on the printing medium, comprises generation means for generating a mask table for outputting print data corresponding to each of a plurality of scanning operations, detection means for detecting faults of the plurality of orifices, change means for changing contents of the mask table, generated by the generation means, on the basis of a detection result of the detection means, and output means for outputting print data based on the image information from each of the plurality of scanning operations using the mask table generated by the generation means or the mask table changed by the change means.

To achieve the above object, a printing apparatus control method according to the present invention comprises the following steps.

That is, a control method for a printing apparatus which performs multipath printing of scanning a plurality of number of times the same printing area of a printing medium with a printhead having a plurality of orifices arranged in a printing medium convey direction, thereby completing an image based on input image information on the printing medium, comprises the generation step of generating a mask table for outputting print data corresponding to each of a plurality of scanning operations, the detection step of detecting faults of the plurality of orifices, the change step of changing contents of the mask table, generated in the generation step, on the basis of a detection result in the detection step, and the output step of outputting print data based on the image information for each of the plurality of scanning operations using the mask table generated in the generation step or the mask table changed in the change step.

To achieve the above object, a computer-readable memory according to the present invention comprises the following program codes.

That is, a computer-readable memory storing control program codes for a printing apparatus which performs multipath printing of scanning a plurality of number of times the same printing area of a printing medium with a printhead having a plurality of orifices arranged in a printing medium convey direction, thereby completing an image based on input image information on the printing medium, comprises a program code of the generation step of generating a mask table for outputting print data corresponding to each of a plurality of scanning operations, a program code of the detection step of detecting faults of the plurality of orifices, a program code of the change step of changing contents of the mask table, generated in the generation step, on the basis of a detection result in the detection step, and a program code of the output step of outputting print data based on the image information for each of the plurality of scanning operations using the mask table generated in the generation step or the mask table changed in the change step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a block diagram showing a path data generation block for performing multipath printing control and path data generation processing according to the first embodiment of the present invention;

FIGS. 3A to 3D are views showing an example of a mask table for each scanning according to the first embodiment of the present invention;

FIG. 6 a perspective view showing the arrangement of the printing unit of an inkjet printing apparatus according to the second embodiment of the present invention;

FIGS. 8A and 8B are flow charts showing table generation control when a non-discharge nozzle is detected in the second embodiment of the present invention;

FIGS. 12A to 12D are views showing an example of mask tables for respective printing scanning operations according to the first embodiment of the present invention;

Figures 13A, 13B, 13C, 13D:
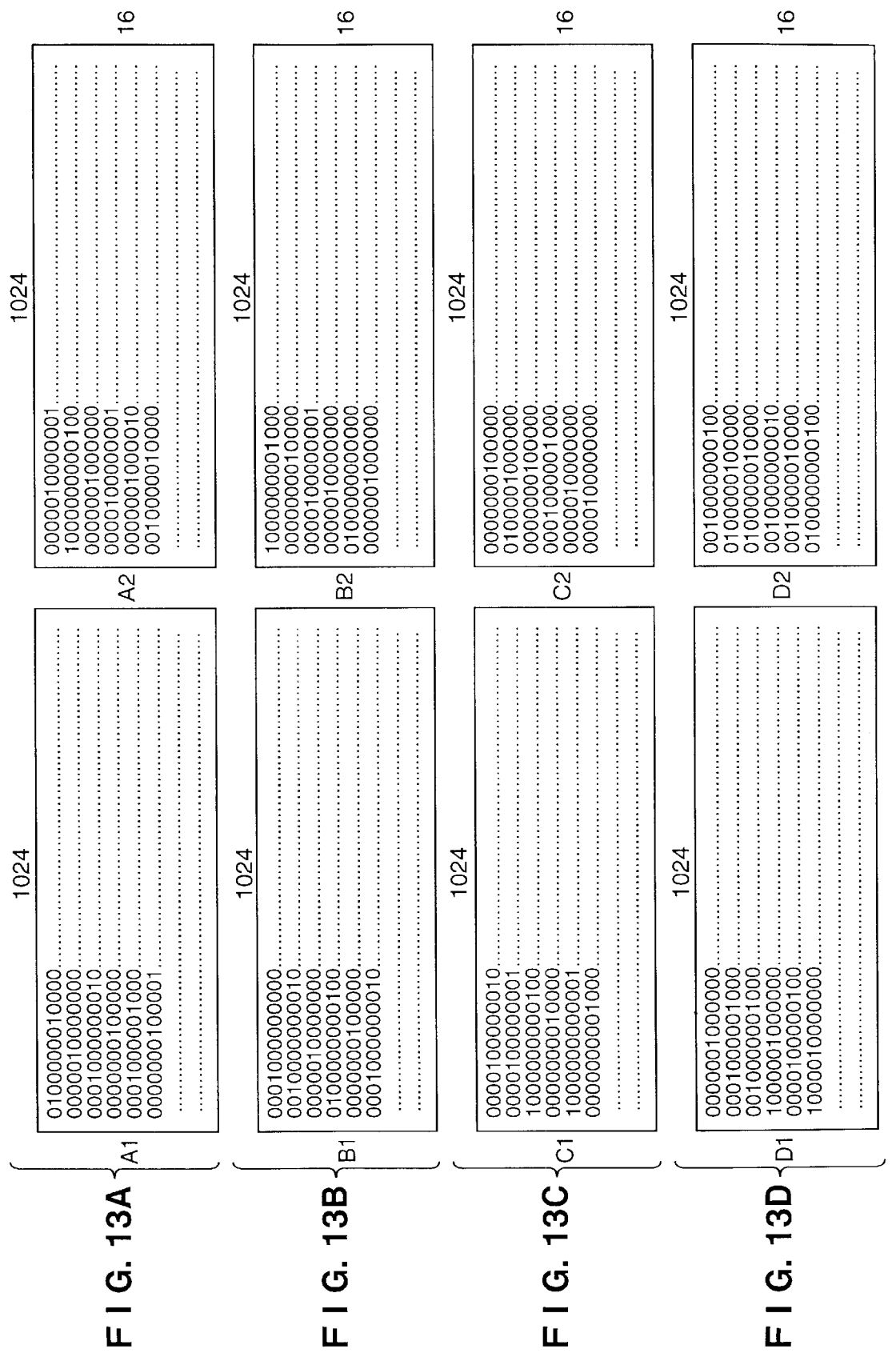

FIGS. 13A to 13D are views showing an example of mask tables for respective printing scanning operations according to the second embodiment of the present invention;

Figures 14A, 14B, 14C, 14D:
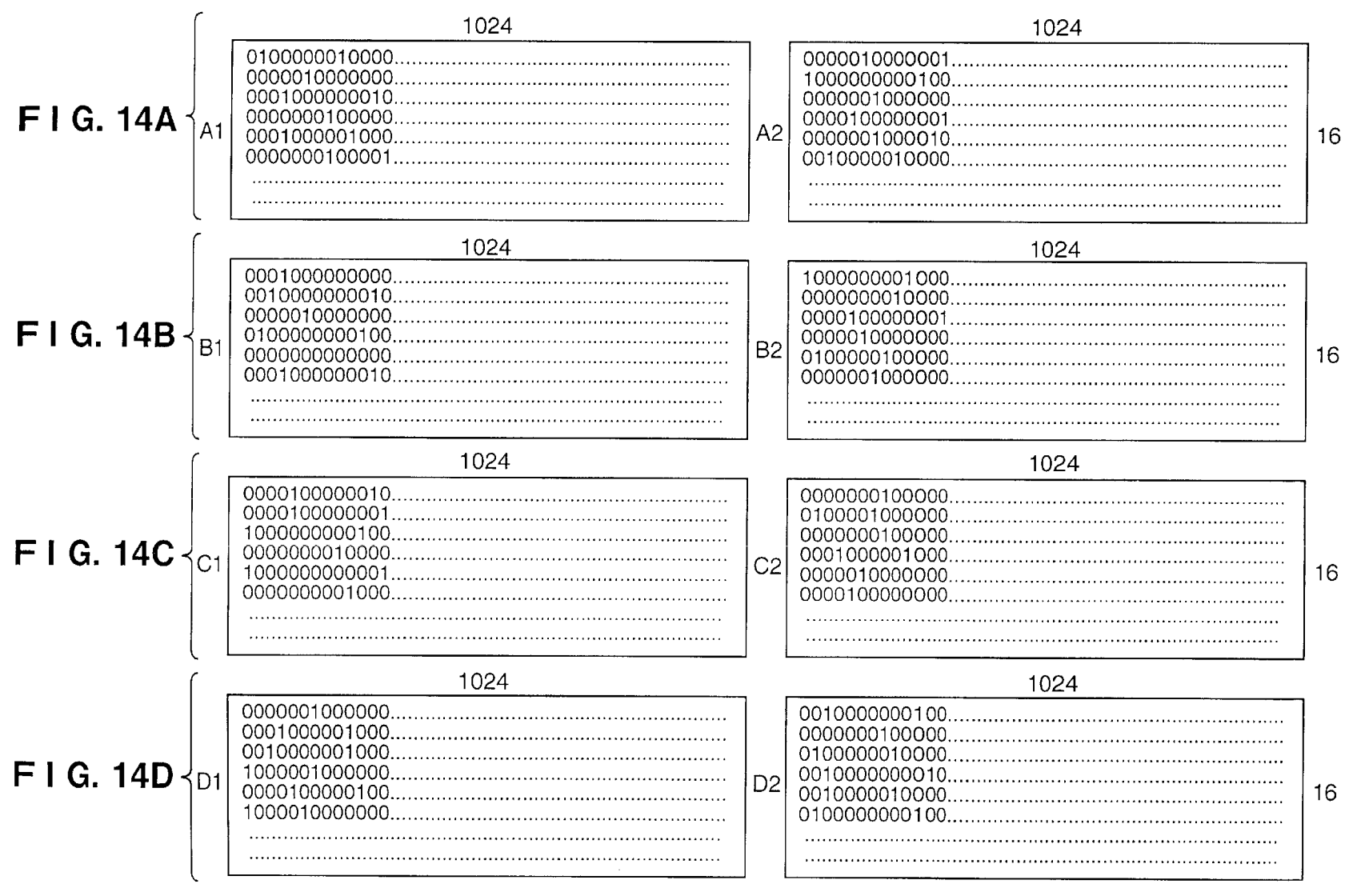

FIGS. 14A to 14D are views showing another example of mask tables for respective printing scanning operations according to the second embodiment of the present invention;

Figures 16A, 16B, 16C, 16D:
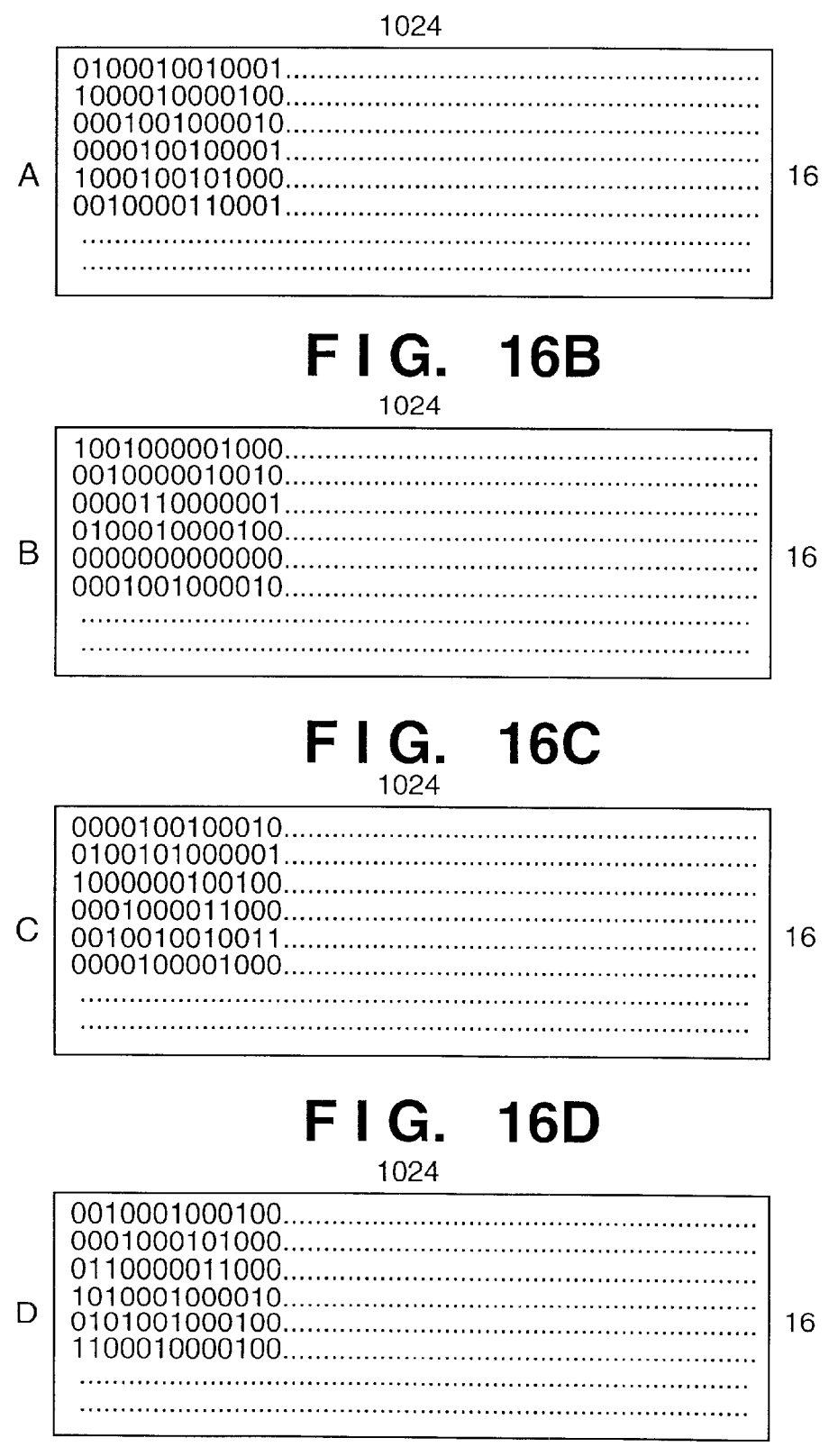

FIGS. 16A to 16D are views showing an example of mask tables for respective printing scanning operations according to the fourth embodiment of the present invention;

FIGS. 17A and 17B are flow charts showing mask table generation control according to the fifth embodiment of the present invention;

FIG. 18 is a view showing an example of a complementary mask table according to the fifth embodiment of the present invention;

Figures 19A, 19B, 19C, 19D:
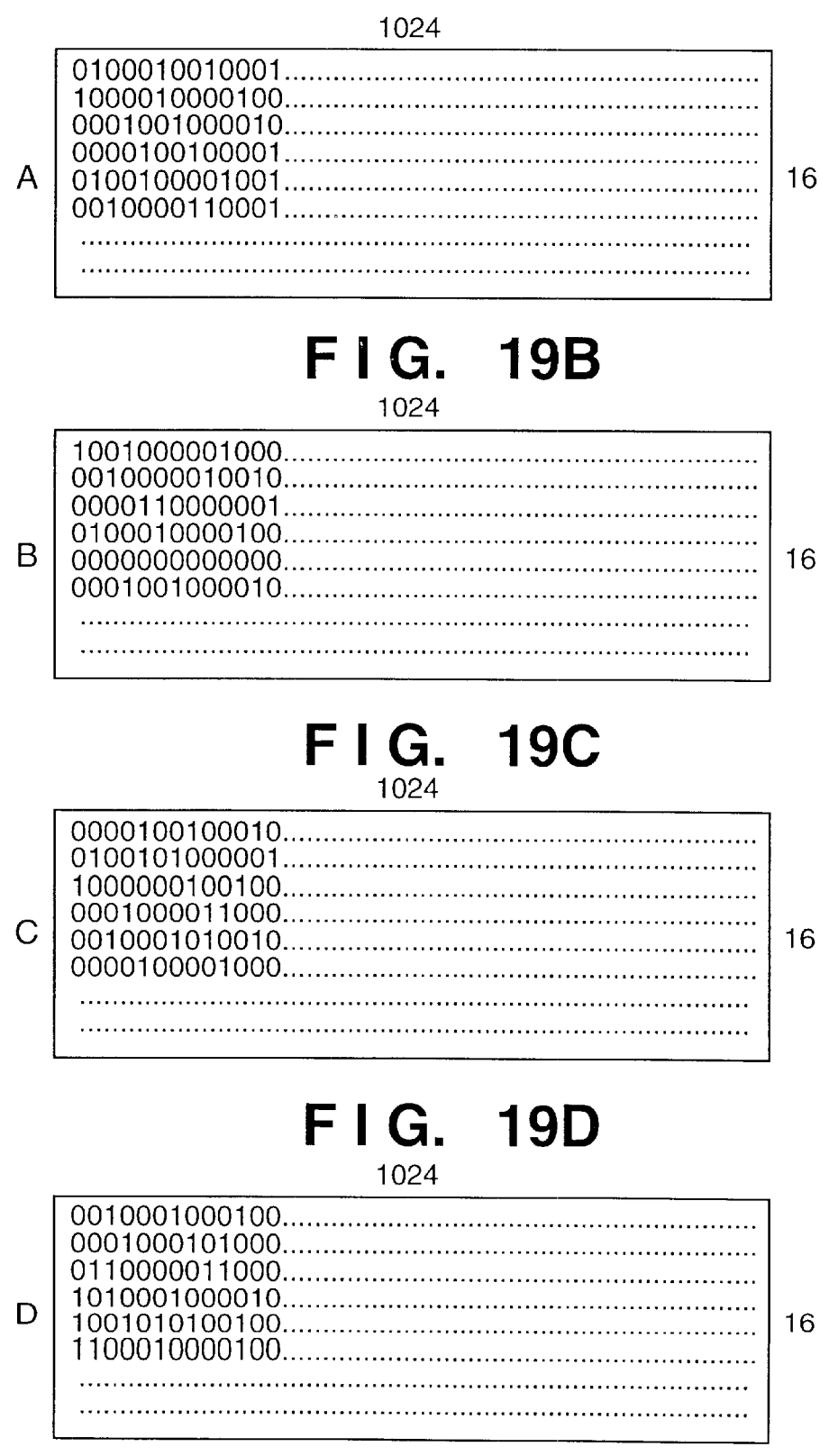

FIGS. 19A to 19D are views showing an example of mask tables for respective printing scanning operations according to the fifth embodiment of the present invention.

DETAILED DESCRIPTION OF THE PREFERRED EMBODIMENTS

Preferred embodiments of the present invention will be described in detail below with reference to the accompanying drawings.

(First Embodiment)

Figure 1:
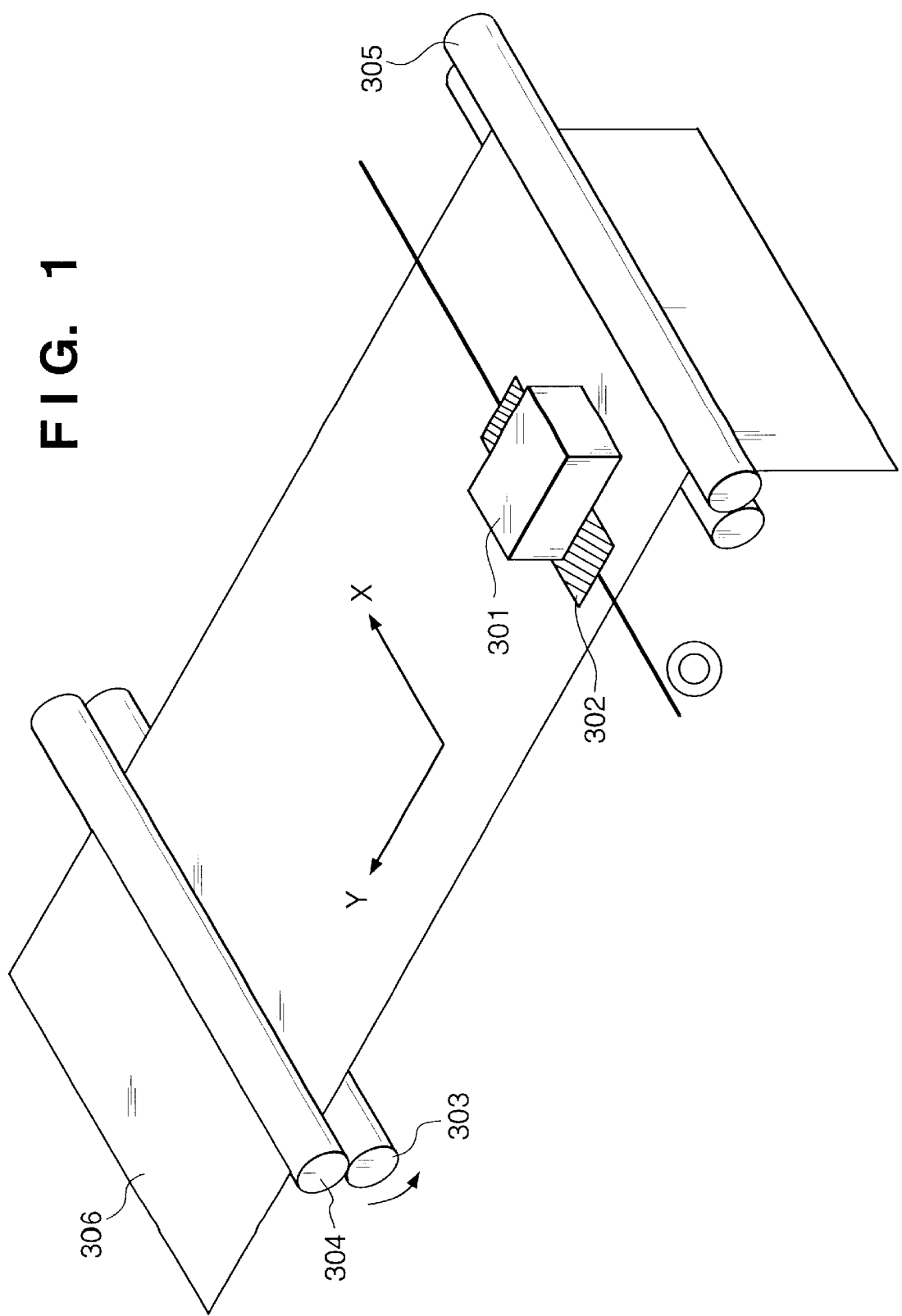
FIG. 1 a perspective view showing the arrangement of the printing unit of an inkjet printing apparatus according to the first embodiment of the present invention.

FIG. 1 is a perspective view showing the arrangement of the printing unit of an inkjet printing apparatus according to the first embodiment of the present invention.

Reference numeral 301 denotes a printhead constituted by a multi-printhead obtained by integrating ink tanks respectively storing color inks of four colors (Bk, Cy, Mg, and Ye) and four corresponding printheads; 302, a carriage which supports the printhead 301 and moves it along with printing. The carriage 302 is at a home position which is shown by "◎" in FIG. 1, in a standby state such as a non-printing state. Reference numeral 303 denotes a paper feed roller which rotates in the arrow direction in FIG. 1 to feed a printing sheet 306 in the Y direction while suppressing the printing sheet 306 together with an auxiliary roller 304; and 305, paper feed rollers which feed the printing sheet 306 while suppressing the printing sheet 306 similarly to the paper feed roller 303 and auxiliary roller 304. The printhead 301 has 64 nozzles arranged in the paper feed direction for the four, Bk, Cy, Mg, and Ye colors. The respective nozzles are assigned with nozzle numbers #0 to #63.

Basic reciprocal printing operation in this arrangement will be described.

While the carriage 302, which is at the home position on standby, scans in the X direction upon reception of a printing start command, the printhead 301 discharges ink from a plurality of nozzles onto the printing sheet 306 in accordance with print data to print the print data. When the print data are printed up to the right end of the printing sheet 306, the carriage 302 returns to the original home position. The paper feed roller 303 rotates in the arrow direction to feed the sheet in the Y direction by a predetermined width, and printing starts in the X direction again. These scanning operation and paper feed operation are repeated to print print data.

Although not shown, the inkjet printing apparatus of the first embodiment comprises a controller made up of a CPU, ROM, RAM, and specific circuit for controlling and executing printing and image processing, an interface for exchanging image information and various control information (the number of printing paths) with an external host computer and the like, a motor driver for driving a carriage motor for driving the carriage, a paper feed motor for driving the paper feed motor, a paper convey motor for conveying a paper sheet, and the like, a printhead driver for driving the printhead 301, an operation panel for allowing the user to input control information, and the like.

The inkjet printing apparatus in the first embodiment adopts a multipath printing method of forming an image by scanning the same printing area a plurality of number of times. As described above, the multipath printing is a printing method of forming a 1-line image using a plurality of nozzles to suppress density nonuniformity caused by a slight difference in ink discharge amount or discharge direction between nozzles, and at the same time decreasing the printing duty of each path to prevent degradation in image quality caused by ink blur.

The first embodiment executes multipath printing using a table thinning method of generating path data by image data mask processing using a mask table. The first embodiment will exemplify 4-path printing. More specifically, a path data generation block like the one shown in FIG. 2 executes multipath printing control and path data generation processing.

FIG. 2 is a block diagram schematically showing the path data generation block for performing multipath printing control and path data generation processing according to the first embodiment of the present invention.

In FIG. 2, ink discharged from the printhead is single-color ink for descriptive convenience.

Reference numeral 102 denotes a memory which temporarily stores image data having undergone image processing for printing and input externally; 101, an input controller for writing print data in the memory 102; 103, an output controller for reading out print data on the basis of the position of the printhead 301 on the surface of the printing sheet 306; 104, a table storage unit storing mask tables A, B, C, and D, details of which will be described in detail later; and 105, a mask processing unit for performing image data mask processing using a mask table stored in the table storage unit 104 to generate path data.

Reference numeral 106 denotes an original table storage unit which is incorporated in a controller 110 and stores table data for generating the mask tables A, B, C, and D, details of which table data will be described later; 107, a table generator which is incorporated in the controller 110, and generates mask tables A, B, C, and D on the basis of original table data stored in the original table storage unit 106 to output them to the table storage unit 104; 108, a non-discharge complementary controller which is incorporated in the controller 110 and changes mask table generation processing executed by the table generator 107 in response to a detection result input from a non-discharge nozzle detection block (not shown); and 110, a controller for monitoring the state of each unit and performing various control operations about path data generation in response to control signals from the units in FIG. 2 and external control signals.

Basic path data generation operation of the whole path data generation block will be explained.

Raster-scanned binary image data is externally input and temporarily stored in the memory 102 via the input controller 101. The output controller 103 sequentially reads out binary image data stored in the memory 102 every scanning in accordance with the position of a nozzle group corresponding to each ink color on the surface of the printing sheet 306 under printing area control of the controller 110. In this case, one data transfer unit is 64-pixel data corresponding to the number of nozzles. The mask processing unit 105 executes image data mask processing (non-print dots replace print dots) using a mask table stored in the table storage unit 104 to generate and output path data.

Path data generation processing by the table thinning method will be described with reference to FIGS. 3A to 3B.

FIGS. 3A to 3B are views showing an example of the mask table for each printing scanning according to the first embodiment of the present invention.

In FIGS. 3, A, B, C, and D are complementary mask tables respectively used in the first, second, third, and fourth paths. Each of the mask tables A to D is a table having a size corresponding to 1,024 pixels in the main scanning direction*16 pixels in the subscanning direction, and this table is repetitively mapped in respective directions and used as mask data. In the first embodiment, the number of nozzles of the printhead 301 is 64, and the number of pixels corresponding to a printing sheet convey amount in 4-path printing is 64/4=16, which coincides with the size of the mask table in the subscanning direction.

Figure 4:
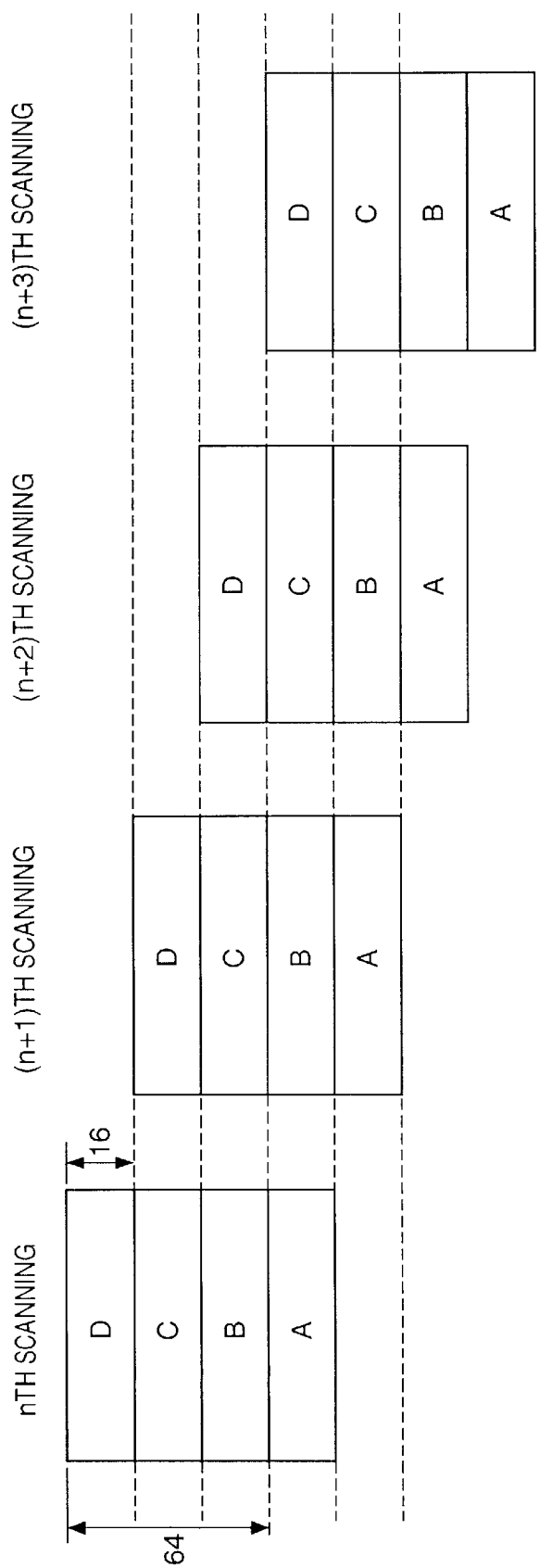
FIG. 4 is a view for explaining printing scanning using the mask table shown in FIGS. 3A to 3B according to the first embodiment of the present invention.

FIG. 4 is a view for explaining printing scanning using the mask table shown in FIGS. 3A and 3B according to the first embodiment of the present invention.

The mask tables A, B, C, and D are applied in units of 16 lines to image data of 64 lines corresponding to the 64 nozzles arranged in the printhead 301. The entire image area undergoes mask processing in the order of A, B, C, and D to generate print data.

Mask table generation control executed by the table generator 107 will be explained in detail.

A normal mask table generation method will be explained.

The table generator 107 generates mask tables A, B, C, and D on the basis of original table data stored in the original table storage unit 106, and outputs them to the table storage unit 104. The original table data includes respective 8-bit data made up of a random sequence, and has a size corresponding to 1,024 pixels in the main scanning direction*32 pixels in the subscanning direction. In 4-path printing, the table generator 107 divides respective 8-bit data by 4 to obtain remainders 0, 1, 2, and 3. The table generator 107 generates four mask tables A, B, C, and D by generating 1 corresponding to the remainders 0, 1, 2, and 3, and stores the mask tables A, B, C, and D in the table storage unit 104. Each mask table has a size of 16 pixels in the subscanning direction. In 2-path printing, the table generator 107 generates mask tables A and B using remainders 0 and 1 resulting from division of respective 8-bit data by 2. In this case, each mask table has a size of 32 pixels in the subscanning direction.

A mask table generation method upon detecting a non-discharge nozzle will be explained.

The basic generation procedure is the same as the normal mask table generation procedure. A non-discharge nozzle means a nozzle which is very unstable in ink droplet size or scattering direction and a nozzle exhibiting a discharge error phenomenon such as failure in normal discharge, in addition to a nozzle which cannot discharge any ink.

The non-discharge nozzle detection block (not shown in FIG. 1) detects an ink discharge error in units of nozzles. Non-discharge detection operation is executed, e.g., at the start of page printing. If a non-discharge nozzle is detected, the non-discharge complementary controller 108 in the controller 110 is informed of the nozzle number of the non-discharge nozzle. The non-discharge complementary controller 108 instructs to change generation of a mask table applied to one of nozzles which form part of the same line as the non-discharge nozzle in accordance with the informed nozzle number until it is confirmed that the discharge error is corrected to resume normal discharge operation. In response to this, the table generator 107 generates mask tables A, B, C, and D on the basis of original table data. Especially in 4-path printing, an image is formed by complementarily printing a given line in the main scanning direction by four scanning operations with different nozzles. Therefore, a line to be printed by the non-discharge nozzle is printed by the remaining three nozzles in the remaining three scanning operations. One of the three nozzles forms dots which should be printed by the non-discharge nozzle to realize a normal image.

This will be exemplified in detail.

Figure 20:
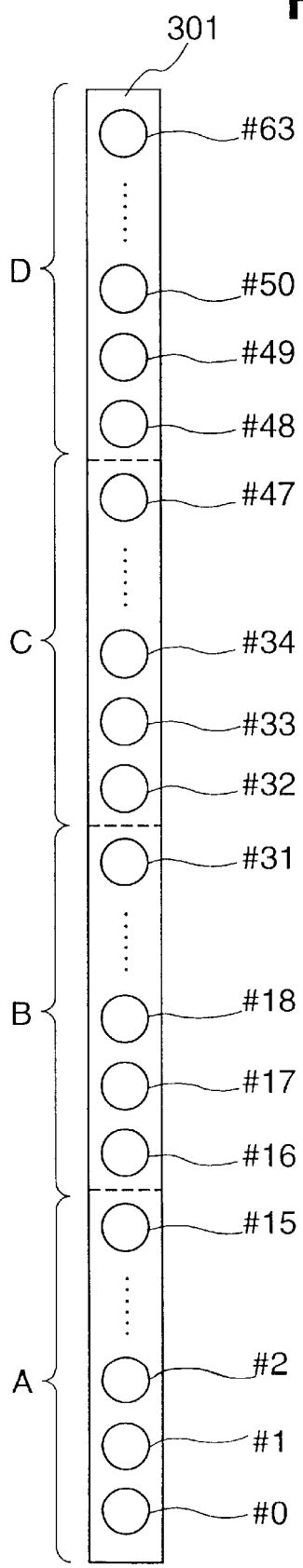
FIG. 20 is a view showing the correspondence between the nozzles of the printhead and nozzle numbers according to the present invention.

FIG. 20 shows the correspondence between 64 nozzles arranged on the printhead 301 and nozzle numbers (#0 to #63). In FIG. 20, the printhead 301 is divided by dotted lines into areas corresponding to the mask patterns A, B, C, and D shown in FIG. 4. Nozzles #0 to #15 correspond to the mask pattern A, nozzles #16 to #31 correspond to the mask pattern B, nozzles #32 to #47 correspond to the mask pattern C, and nozzles #48 to #63 correspond to the mask pattern D.

Figures 12A, 12B, 12C, 12D:
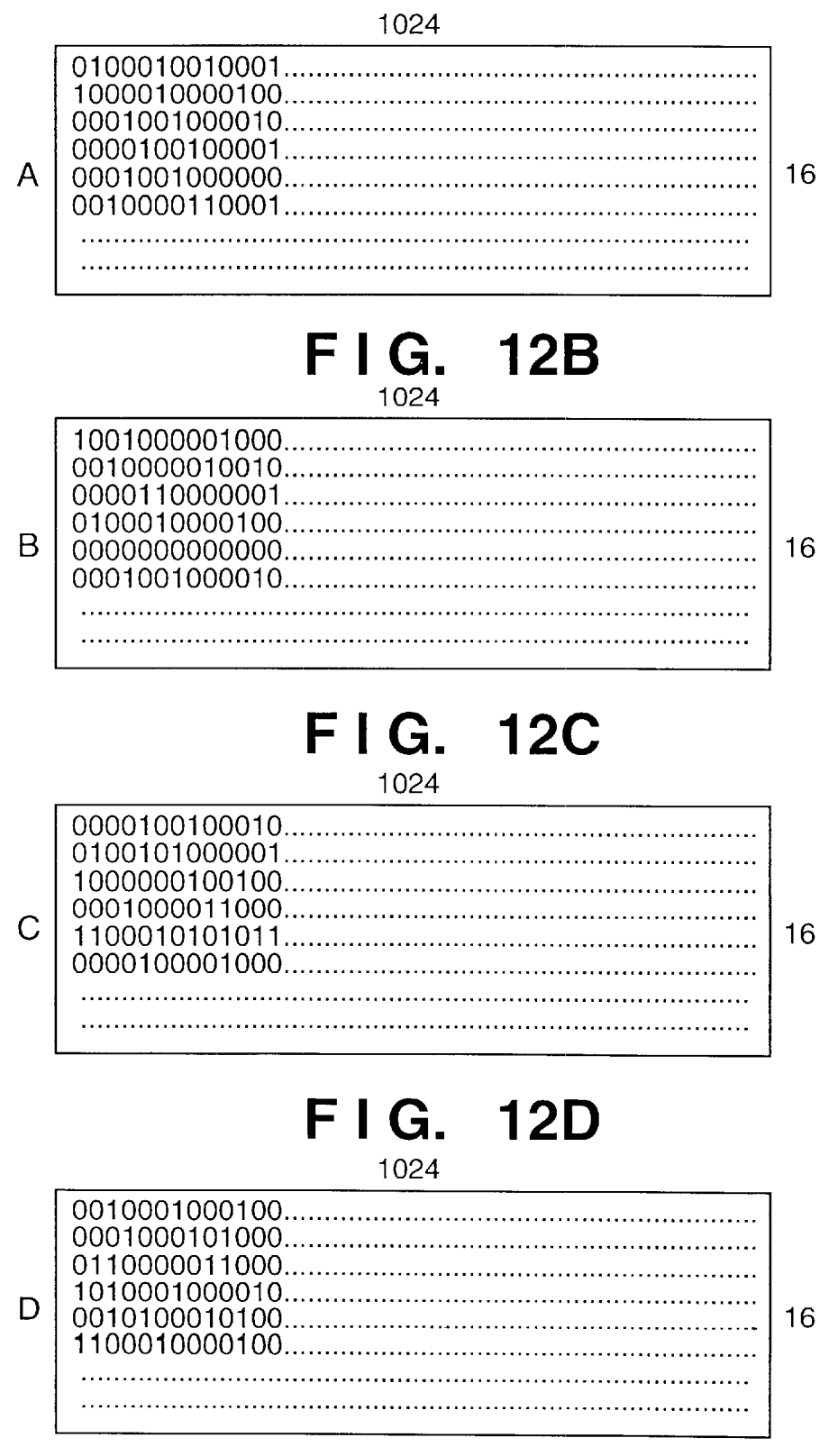

FIGS. 12A to 12D show an example of mask tables generated with respect to the mask tables shown in FIGS. 3A to 3D when a discharge error is detected in the nozzle #20. The mask tables shown in FIGS. 12A to 12D cause the nozzle #36 capable of normal discharge to complementarily print dots which should be printed by the non-discharge nozzle #20. More specifically, since the nozzle #20 cannot print dots, all positions corresponding to the nozzle #20 in the table B in FIG. 12B are set to "0". As for a pattern corresponding to the nozzle #36 in the table C in FIG. 12C, "1"s (representing dot printing) corresponding to the nozzle #20 in the table B in FIG. 12B are added to positions corresponding to the nozzle #36 in the table C in FIG. 12C.

As described above, an ink discharge error is detected in a nozzle having #20. The nozzle having #20 is associated with a nozzle area using the mask table B, and corresponds to the fifth line of the mask table B. The remaining three nozzles which form dots on the same line as dots which should be printed by the nozzle having #20 are a nozzle having #4 (using the mask table A), a nozzle having #36 (using the mask table C), and a nozzle having #52 (using the mask table D). In this case, dots which should be printed by the non-discharge nozzle having #20 are complementarily printed using the nozzle having #36 to which the mask table C is applied.

To realize this, control different from normal control is done for table data generation processing for the fifth line of the mask table C applied to the nozzle having #36. More specifically, in generating mask data of the fifth line of the mask table C from original table data, data "1" is generated for a dot position corresponding to a remainder "1" in addition to a dot position corresponding to a remainder "2" resulting from normal division by 4. Thus, a normal image can be formed by assigning dots which should be printed by the non-discharge nozzle having #20 to the nozzle having #36 capable of normal discharge. All data of the fifth line of the mask table B corresponding to the non-discharge nozzle having #20 are changed to 0 regardless of a value stored in the original table storage unit 106 so as to stop supply of any print dot.

In the above example, print dots of the non-discharge nozzle in the mask table B are assigned to the mask table C for the same line. Similarly, print dots in the mask tables C, D, and A can be respectively assigned to the mask tables D, A, and B.

Mask table generation control of generating a mask table upon detection of a non-discharge nozzle in the first embodiment will be described with reference to FIGS. 5A and 5B.

Figure 5A:
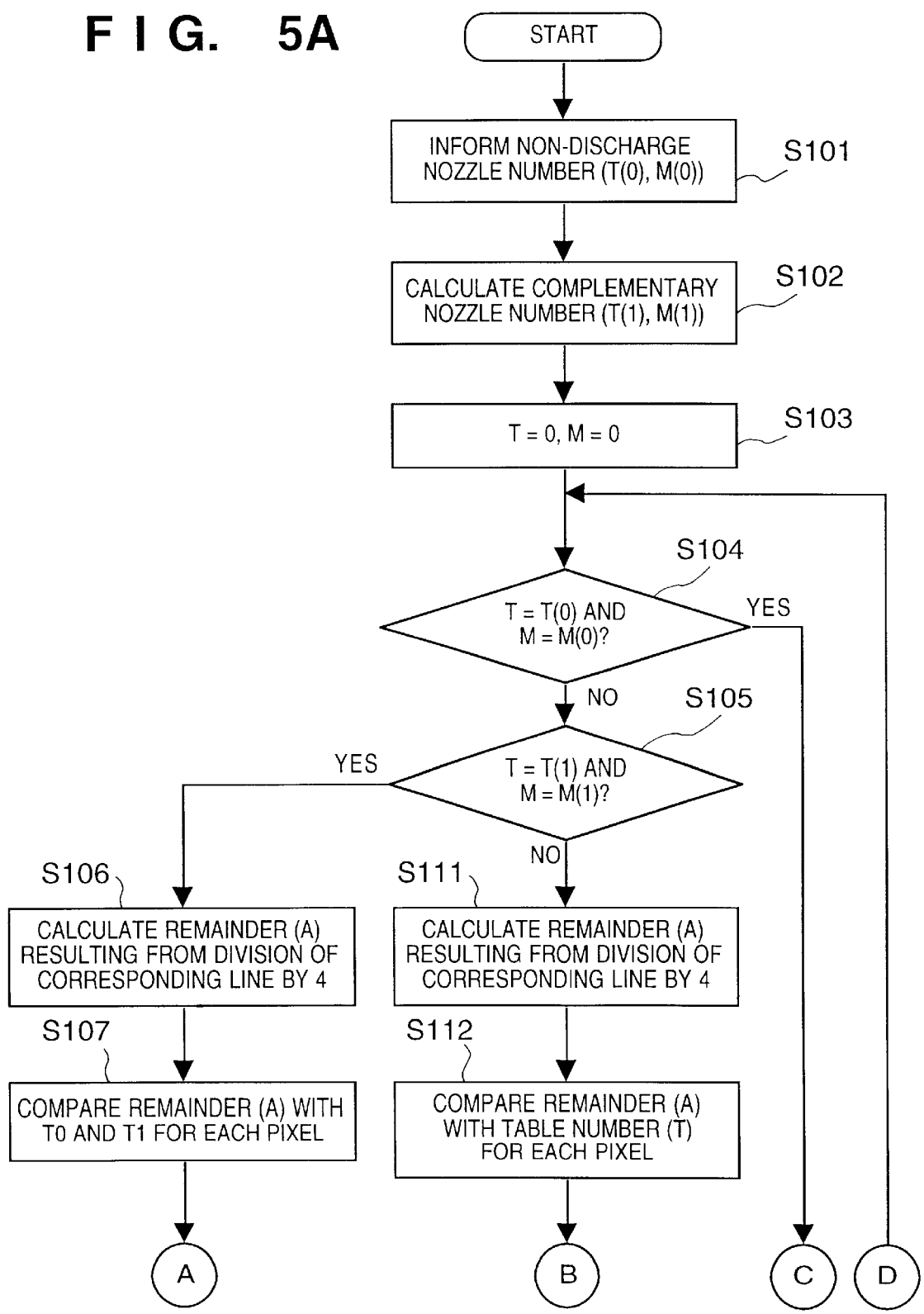
FIGS. 5A and 5B are flow charts showing table generation control when a non-discharge nozzle is detected in the first embodiment of the present invention.
Figure 5B:
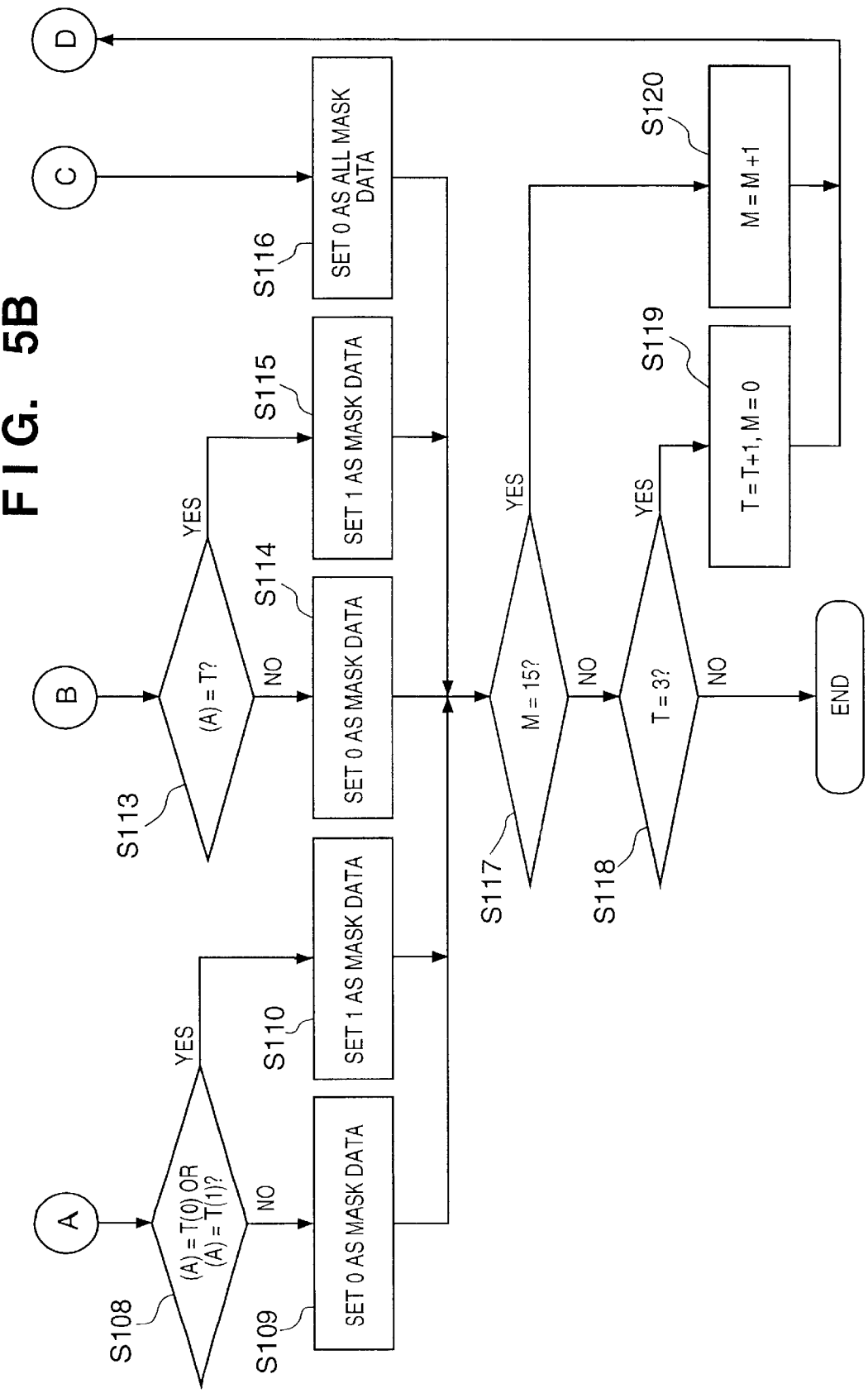

FIGS. 5A and 5B are flow charts showing mask table generation control upon detection of a non-discharge nozzle in the first embodiment of the present invention.

In the following description, a table number T takes values of 0, 1, 2, and 3, which respectively correspond to the mask tables A, B, C, and D. A raster address M indicates a line of the mask table A, B, C, or D, and takes values of 0, 1, 2, 3, 4, 5, 6, 7, 8, 9, 10, 11, 12, 13, 14, and 15.

If a non-discharge nozzle is detected, a non-discharge nozzle number (=N(0)) as the nozzle number of the detected nozzle is informed. The non-discharge nozzle number is converted into a table number (=T(0)) and a raster address (=M(0)) in the table (step S101). In this case, N(0)=16*T(0)+M(0).

A complementary nozzle number as the nozzle number of a complementary nozzle used instead of the non-discharge nozzle is calculated (step S102). The complementary nozzle number (=N(1)) can be given by N(1)=16*T(1)+M(1) for T(1)=T(0)+1 and M(1)=M(0). Note that T(1)=0 for T(0)=3. The table number T and raster address M are initialized to 0 (step S103).

Processing from steps S104 to S120 is repetitively executed by the following procedure.

A mask table is generated in the order of the 0th line (M=0), the first line (M=1), the second line (M=2), . . . of a mask table A (T=0). Subsequently, mask tables B (T=1), C (T=2), and D (T=3) are generated in this order. Table data applied to normal nozzles not as non-discharge nozzles or complementary nozzles are generated by dividing original table data by 4 to obtain a remainder (A). If the remainder (A) coincides with the table number T, table data is set to 1; if the remainder (A) does not coincide with the table number T, table data is set to 0. Table data (T=T(1), M=M(1)) applied to the complementary nozzle is generated by dividing original table data by 4 to obtain a remainder (A(1)). If the remainder (A(1)) coincides with the table number (T(1)) of the complementary nozzle or the table number (T(0)) of the non-discharge nozzle, table data is set to 1; otherwise, table data is set to 0. Table data (T=T(0), M=M(0)) applied to the non-discharge nozzle is set to 0 regardless of the remainder (A(0)) resulting from division of original table data by 4.

By this mask table generation processing, dots that should be printed by a nozzle having a detected ink discharge error are assigned to a nozzle which forms the same line by another scanning. Thus, image omission by a discharge error can be avoided to form a normal image.

As described above, according to the first embodiment, a discharge error is detected in units of nozzles in the inkjet printing apparatus which performs multipath printing by the table thinning method. When a discharge error is detected, mask table generation is partially changed to assign dots which should be printed by the non-discharge nozzle to a nozzle which forms the same line by another scanning, thereby complementarily printing the dots. This allows continuing a normal printing function without exchanging the printhead. In other words, the apparatus reliability can be improved without adding any large-scale specific circuit, special structure or the like, the apparent service life of the printhead can be prolonged, and an excellent, low-running-cost inkjet printing apparatus can be provided.

In the first embodiment, when a discharge error occurs in a nozzle corresponding to the mask table B, dots which should be printed by the non-discharge nozzle are assigned using the mask tables so as to print the dots by a nozzle corresponding to the same line in the mask table C. However, the present invention is not limited to the above-described example. All nozzles associated with printing on the same line as the non-discharge nozzle can be selected as complementary nozzle candidates. In the above example, dots which should be printed by the non-discharge nozzle can be assigned to not only the table C but also the tables A and D. This also applies to the case in which a discharge error occurs in a nozzle corresponding to the table A, C, or D.

(Second Embodiment)

In the first embodiment, the multi-printhead constituted by integrating ink tanks respectively containing color inks of four colors (Bk, Cy, Mg, and Ye) and four corresponding printheads is mounted on the inkjet printing apparatus. However, the number of mounted printheads is not limited to one, and the present invention can also be applied to an inkjet printing apparatus having a plurality of printheads.

The second embodiment concerns complementary printing control for an ink discharge error in an inkjet printing apparatus in which two printheads for four colors (Bk, Cy, Mg, and Ye) are arranged in the main scanning direction.

The arrangement of the printing unit of the inkjet printing apparatus according to the second embodiment will be described with reference to FIG. 6.

FIG. 6 is a perspective view showing the arrangement of the printing unit of an inkjet printing apparatus according to the second embodiment of the present invention.

The basic printing operation and internal arrangement of the inkjet printing apparatus are the same as in the first embodiment except that the number of printheads is one or two.

Reference numerals 801 and 811 denote first and second printheads each constituted by a multi-printhead obtained by integrating ink tanks respectively storing color inks of four colors (Bk, Cy, Mg, and Ye) and four corresponding printheads; and 802, a carriage which supports the first and second printheads 801 and 811 and moves them along with printing. The carriage 802 is at a home position which is shown by ⊙ in FIG. 6, in a standby state such as a non-printing state. Reference numeral 803 denotes a paper feed roller which rotates in the arrow direction in FIG. 6 to feed a printing sheet 806 in the Y direction while suppressing the printing sheet 806 together with an auxiliary roller 804; and 805, paper feed rollers which feed the printing sheet 806 while suppressing the printing sheet 806 similarly to the paper feed roller 803 and auxiliary roller 804. Each of the first and second printheads 801 and 811 has 64 nozzles arranged in the paper feed direction for the four, Bk, Cy, Mg, and Ye colors.

Similar to the first embodiment, the inkjet printing apparatus in the second embodiment performs multipath printing using the table thinning method of generating path data by image data mask processing using a mask table. At the same time, the second embodiment realizes data distribution processing to the two printheads using the mask table. The second embodiment will exemplify 4-path printing. More specifically, a path data generation block like the one shown in FIG. 7 executes multipath printing control and path data generation processing.

Figure 7:
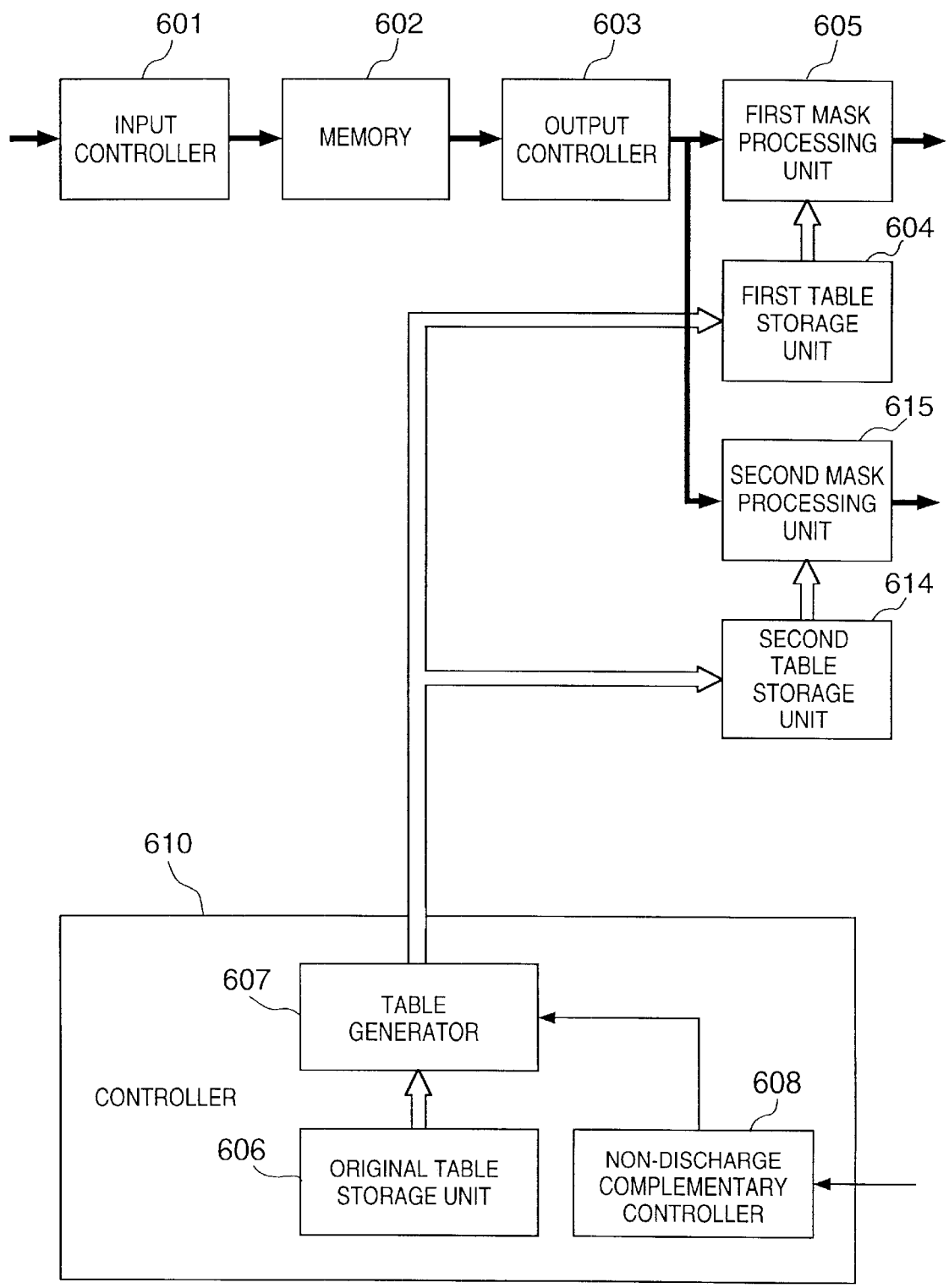
FIG. 7 is a block diagram showing a path data generation block for performing multipath printing control and path data generation processing according to the second embodiment of the present invention.

FIG. 7 is a block diagram schematically showing the path data generation block for performing multipath printing control and path data generation processing according to the second embodiment of the present invention.

In FIG. 7, ink discharged from the printhead is single-color ink for descriptive convenience.

Reference numeral 602 denotes a memory which temporarily stores image data having undergone image processing for printing and input externally; 601, an input controller for writing print data in the memory 602; 603, an output controller for reading out print data on the basis of the position of the printhead on the surface of the printing sheet 806; 604, a first table storage unit storing mask tables A1, B1, C1, and D1 for the first printhead 801; and 605, a first mask processing unit for performing image data mask processing using a mask table stored in the first table storage unit 604 to generate path data for the first printhead 801.

Reference numeral 614 denotes a second table storage unit storing mask tables A2, B2, C2, and D2 for the second printhead 802; and 615, a second mask processing unit for performing image data mask processing using a mask table stored in the second table storage unit 614 to generate path data for the second printhead 811.

Reference numeral 606 denotes an original table storage unit which is incorporated in a controller 610 and stores table data for generating the mask tables; 607, a table generator which is incorporated in the controller 610, generates mask tables A1, B1, C1, and D1 on the basis of original table data stored in the original table storage unit 606 to store them in the first table storage unit 604, and generates mask tables A2, B2, C2, and D2 to store them in the second table storage unit 614; 608, a non-discharge complementary controller which is incorporated in the controller 610 and changes mask table generation processing executed by the table generator 607 in response to a detection result input from a non-discharge nozzle detection block (not shown); and 610, a controller for monitoring the state of each unit and performing various control operations about path data generation in response to control signals from the units in FIG. 7 and external control signals.

Basic path data generation operation of the whole path data generation block will be explained.

Raster-scanned binary image data is externally input and temporarily stored in the memory 602 via the input controller 601. The output controller 603 sequentially reads out binary image data stored in the memory 602 every scanning in accordance with the position of a nozzle group corresponding to each ink color on the surface of the printing sheet 806 under printing area control of the controller 610. The first mask processing unit 605 executes image data mask processing (non-print dots replace print dots) using a mask table stored in the first table storage unit 604 to generate and output path data for the first printhead 801. The second mask processing unit 615 executes image data mask processing (non-print dots replace print dots) using a mask table stored in the second table storage unit 614 to generate and output path data for the second printhead 811.

Mask table generation control executed by the table generator 607 will be explained in detail.

A normal mask table generation method will be explained.

FIGS. 13A to 13D show normal mask tables corresponding to the two printheads The table generator 607 generates mask tables A1, B1, C1, D1, A2, B2, C2, and D2 on the basis of original table data stored in the original table storage unit 606. The original table data includes respective 8-bit data basically made up of a random sequence, and has a size corresponding to 1,024 pixels in the main scanning direction*32 pixels in the subscanning direction. In 4-path printing, the table generator 607 divides respective 8-bit data by 8 to obtain remainders 0, 1, 2, 3, 4, 5, 6, 7, and 8. The table generator 607 generates eight mask tables A1, B1, C1, D1, A2, B2, C2, and D2 by generating 1 corresponding to the remainders 0, 1, 2, 3, 4, 5, 6, 7, and 8 and stores the mask tables A1, B1, C1, and D1 in the first table storage unit 604 and the mask tables A2, B2, C2, and D2 in the second table storage unit 614. Each mask table has a size of 16 pixels in the subscanning direction. In 2-path printing, the table generator 607 generates four tables A1, B1, A2, and B2 using remainders 0, 1, 2, and 3 resulting from division of respective 8-bit data by 4. In this case, each mask table has a size of 32 pixels in the subscanning direction.

A mask table generation method upon detecting a non-discharge nozzle will be explained. The basic generation procedure is the same as the normal mask table generation procedure.

The non-discharge nozzle detection block (not shown in FIG. 6) detects an ink discharge error for the two printheads in units of nozzles. Non-discharge detection operation is executed, e.g., at the start of page printing. If a non-discharge nozzle is detected, the non-discharge complementary controller 608 in the controller 610 is informed of the nozzle number of the non-discharge nozzle. The non-discharge complementary controller 608 instructs to change generation of a mask table applied to a nozzle which forms part of the same line as the non-discharge nozzle in accordance with the informed nozzle number until it is confirmed that the discharge error is corrected to resume normal discharge operation. In response to this, the table generator 607 generates mask tables A1, B1, C1, D1, A2, B2, C2, and D2 on the basis of original table data. Especially in 4-path printing, an image is formed by complementarily printing a given line in the main scanning direction by four scanning operations with eight different nozzles. Therefore, a line to be printed by the non-discharge nozzle is printed by the remaining seven nozzles in all the four scanning operations. One of the seven nozzles forms dots which should be printed by the non-discharge nozzle to realize a normal image.

This will be exemplified in detail.

For example, an ink discharge error is detected in a nozzle #20 of the first printhead 801. In this case, the nozzles of the first printhead are assigned with nozzle #0 to #63, and the nozzles of the second printhead are assigned with nozzle #64 to #127. The nozzle having #20 of the first printhead 801 is associated with a nozzle area using the mask table B1, and corresponds to the fifth line of the mask table B1. The remaining seven nozzles which form dots on the same line as dots which should be printed by the nozzle having #20 of the first printhead 801 are a nozzle having #4 (using the mask table A1), nozzle having #36 (using the mask table C1), and nozzle having #52 (using the mask table D1) of the first printhead 801, and a nozzle having #68 (using the mask table A2), nozzle having #84 (using the mask table B2), nozzle having #100 (using the mask table C2), and nozzle having #116 (using the mask table D2) of the second printhead 811.

In this case, the nozzle having #84 of the second printhead 811 which is an identical nozzle of the other printhead complementarily prints dots which should be printed by the non-discharge nozzle having #20. To realize this, control different from normal control is done for table data generation processing for the fifth line of the mask table B2 applied to the nozzle having #84 of the second printhead 811. More specifically, in generating mask data of the fifth line of the mask table B2 from original table data, data "1" is generated for a dot position corresponding to a remainder "1" in addition to a dot position corresponding to a remainder "5" resulting from normal division by 8. Thus, a normal image can be formed by assigning dots which should be printed by the non-discharge nozzle having #20 of the first printhead 801 to the nozzle having #84 of the second printhead 811 capable of normal discharge. All data of the fifth line of the mask table B corresponding to the non-discharge nozzle having #20 are changed to 0 regardless of a value stored in the original table so as to stop supply of any print dot.

In the above example, print dots of the non-discharge nozzle in the mask table B1 are assigned to the mask table B2 for the same line. Similarly, print dots in the mask tables C1, D1, and A1 can be respectively assigned to the mask tables C2, D2, and A2.

FIGS. 14A to 14D show an example of mask tables generated with respect to the mask tables shown in FIGS. 13A to 13D when a discharge error is detected in the nozzle #20 of the first printhead. Tables are generated such that dots which should be printed by the non-discharge nozzle #20 (a nozzle corresponding to the first printhead) are complimentarily printed by the nozzle #84 (a nozzle corresponding to the second printhead) capable of normal discharge.

Mask table generation control of generating a mask table upon detection of a non-discharge nozzle in the second embodiment will be described with reference to FIGS. 8A and 8B.

FIGS. 8A and 8B are flow charts showing mask table generation control upon detection of a non-discharge nozzle in the second embodiment of the present invention.

In the following description, the table number T takes values of 0, 1, 2, 3, 4, 5, 6, and 7, which respectively correspond to the mask tables A1, B1, C1, D1, A2, B2, C2, and D2. The raster address M indicates a line of the mask table A, B, C, or D, and takes values of 0, 1, 2, 3, 4, 5, 6, 7, 8, 9, 10, 11, 12, 13, 14, and 15.

If a non-discharge nozzle is detected, a non-discharge nozzle number (=N(0)) as the nozzle number of the detected nozzle is informed. The non-discharge nozzle number is converted into a table number (=T(0)) and a raster address (=M(0)) in the table (step S201).

A complementary nozzle number as the nozzle number of a complementary nozzle used instead of the non-discharge nozzle is calculated (step S202). The complementary nozzle number (=N(1)) can be given by N(1)=16*T(1)+M(1) for M(1)=M(0), and T(1)=4, 5, 6, 7, 0, 1, 2, and 3 respectively for T(0)=0, 1, 2, 3, 4, 5, 6, and 7. The table number T and raster address M are initialized to 0 (step S203).

Processing from steps S204 to S220 is repetitively executed by the following procedure.

A mask table is generated in the order of the 0th line (M=0), the first line (M=1), the second line (M=2), . . . of a mask table A1 (T=0). Subsequently, mask tables B1 (T=1), C1 (T=2), D1 (T=3), A2 (T=4), B2 (T=5), C2 (T=6), and D2 (T=7) are generated in this order. Table data applied to normal nozzles not as non-discharge nozzles or complementary nozzles are generated by dividing original table data by 8 to obtain a remainder (A). If the remainder (A) coincides with the table number T, table data is set to 1; if the remainder (A) does not coincide with the table number T, table data is set to 0. Table data (T=T(1), M=M(1)) applied to the complementary nozzle is generated by dividing original table data by 8 to obtain a remainder (A(1)). If the remainder (A(1)) coincides with the table number (T(1)) of the complementary nozzle or the table number (T(0)) of the non-discharge nozzle, table data is set to 1; otherwise, table data is set to 0. Table data (T=T(0), M=M(0)) applied to the non-discharge nozzle is set to 0 regardless of the remainder (A(0)) resulting from division of original table data by 8.

By this mask table generation processing, dots that should be printed by a nozzle having a detected ink discharge error are assigned to a nozzle (of the other printhead) which forms the same line. Thus, image omission by a discharge error can be avoided to form a normal image.

As described above, according to the second embodiment, a discharge error is detected in units of nozzles in the inkjet printing apparatus which performs multipath printing by the table thinning method. When a discharge error is detected, mask table generation is partially changed to assign dots which should be printed by the non-discharge nozzle to a nozzle of the other printhead which forms the same line, thereby complementarily printing the dots. This allows continuing a normal printing function without exchanging the printhead. In other words, the apparatus reliability can be improved without adding any large-scale specific circuit or the like, the apparent service life of the printhead can be prolonged, and an excellent, low-running-cost inkjet printing apparatus can be provided.

In the second embodiment, when a discharge error occurs in a nozzle corresponding to the mask table B1, dots which should be printed by the non-discharge nozzle are assigned using the mask tables so as to print the dots by a nozzle corresponding to the same line in the mask table B2. However, the present invention is not limited to the above-described example. All nozzles associated with printing on the same line as the non-discharge nozzle can be selected as complementary nozzle candidates. Dots which should be printed by the non-discharge nozzle can be assigned to not only the table B2 as in the above example but also the tables A1, C1, D1, A2, C2, and D2. This also applies not only the case in which a discharge error occurs in the table B1 but also the case in which a discharge error occurs in a nozzle corresponding to another mask table.

The above complementary nozzle selection control is executed optimally for the system. In the second embodiment, a nozzle of the other printhead which forms the same line as a non-discharge nozzle in the same scanning is selected as a complementary nozzle. Thus, the ratio of dots formed in each scanning can be kept unchanged, and the image quality is hardly influenced. On the other hand, considering a relative attaching position error or adjustment error between these printheads, another nozzle of the printhead including the non-discharge nozzle may be preferably selected as a complementary nozzle. The complementary nozzle is much higher in discharge ratio than the remaining nozzles. Therefore, considering the service life until exchange of the printhead, another nozzle of the printhead including the non-discharge nozzle is preferably selected as a complementary nozzle.

(Third Embodiment)

In the first and second embodiments, a discharge error of each nozzle disposed on the printhead is detected during non-printing operation, e.g., before the start of page printing or before the start of printing a predetermined period after printing operation is stopped. The third embodiment is about complementary printing for a discharge error during printing operation.

The third embodiment has the same basic arrangement as in the first embodiment. The third embodiment will exemplify the case in which a non-discharge nozzle is detected when the carriage returns during printing operation. The printhead comprises 64 nozzles in the paper feed direction and forms a high-quality image by 4-path printing.

Figure 9:
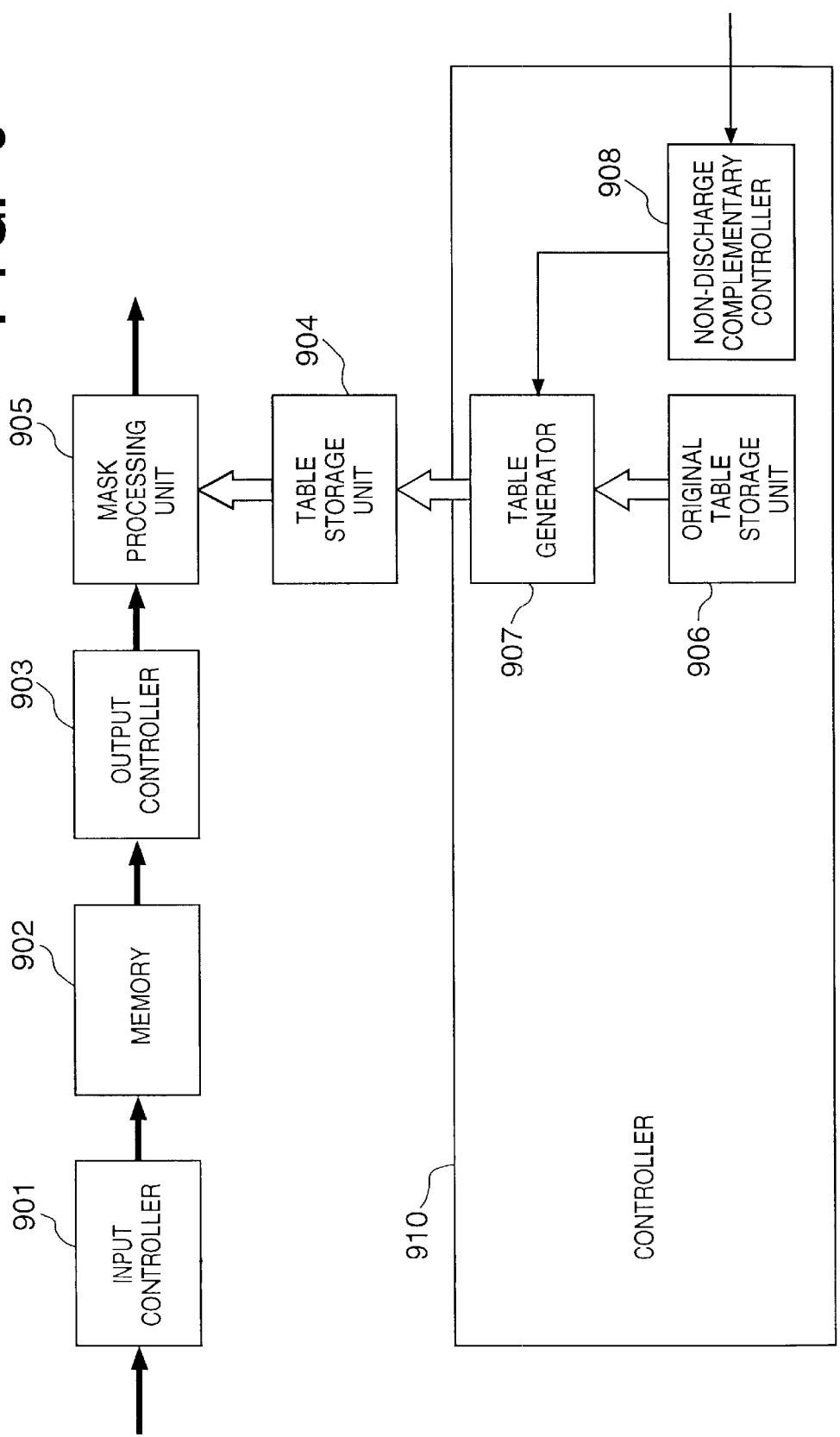
FIG. 9 is a block diagram showing a path data generation block for performing multipath printing control and path data generation processing according to the third embodiment of the present invention.

FIG. 9 is a block diagram schematically showing a path data generation block for performing multipath printing control and path data generation processing according to the third embodiment of the present invention.

Although the basic arrangement is the same as in the first embodiment shown in FIG. 1, the reference numerals 901–908 and 910 (corresponding to reference numerals 101–108 and 110 in FIG. 2) of respective constituents differ from those in the first embodiment in order to distinguish the third embodiment from the first embodiment. Assume that a discharge error occurs in, e.g., the nozzle having #20.

If a non-discharge nozzle is detected upon completion of one printing scanning and before the start of next printing scanning, the whole mask table generation processing cannot be executed again. Since the whole mask table generation processing requires a long processing time, as described above, the time interval between printing scanning operations in multipath printing becomes very long to cause density nonuniformity in the printing area. Hence, mask table generation processing is desirably realized by a simple mask table rewrite.

If a discharge error is detected during page printing, a non-discharge complementary controller 908 in a controller 910 is informed of the nozzle number of the non-discharge nozzle. The non-discharge complementary controller 908 instructs to rewrite a mask table applied to one of nozzles which form part of the same line as the non-discharge nozzle in accordance with the informed nozzle number until it is confirmed that the discharge error is corrected to resume normal discharge operation. In response to this, a table generator 907 regenerates only table data applied to the non-discharge nozzle having #20 and a nozzle having #4 and serving as a complementary nozzle, and rewrites only a corresponding area in a table storage unit 904. In subsequent printing scanning, dots which should be printed by the non-discharge nozzle having #20 are assigned to the complementary nozzle having #36 to form a normal image.

By this processing, recovery processing need not be performed for an ink discharge error during page printing by interrupting printing. Dots which should be printed by a nozzle having the detected ink discharge error are assigned to a nozzle which forms the same line by another scanning. Thus, image omission by a discharge error can be avoided to form a normal image.

As described above, according to the third embodiment, if a discharge error is detected during page printing, part of a mask table is regenerated and rewritten in the inkjet printing apparatus which performs multipath printing by the table thinning method. Dots which should be printed by the non-discharge nozzle are assigned to a nozzle which forms the same line by another scanning, thereby complementarily printing the dots. Accordingly, a normal image can be formed without performing any recovery processing by interrupting printing processing during page printing. In other words, the third embodiment can realize a high-speed inkjet printing apparatus with high reliability which does not require any additional large-scale specific circuit or the like, even if an ink discharge error occurs, can avoid an increase in printing time due to recovery processing during printing, and can form an image free from any density nonuniformity caused by the difference in time interval between printing scanning operations in multipath printing.

(Fourth Embodiment)

In the above embodiments, any one of nozzles capable of forming the same line as a non-discharge nozzle is selected as a complementary nozzle, and all dots which should be formed by the non-discharge nozzle are assigned to and printed by the single complementary nozzle.

In the fourth embodiment, dots which should be formed by the non-discharge nozzle are assigned to and printed by a plurality of nozzles.

The basic operation and internal arrangement of an inkjet printing apparatus are the same as in the first embodiment, and a detailed description thereof will be omitted.

The feature of a mask table generation method in the fourth embodiment when a discharge error occurs in a given nozzle of the printhead will be explained in detail with reference to the accompanying drawings.

For example, a discharge error occurs in the nozzle #20 of 64 nozzles arranged on the printhead shown in FIG. 20. As described in the first embodiment, the nozzle #20 corresponds to the fifth line of the mask table B. When an image is formed by four scanning operations as shown in FIG. 4, the remaining nozzles which form dots on the same line as dots which should be printed by the nozzle #20 are three nozzles, i.e., the nozzle #4 (using the mask table A), the nozzle #36 (using the mask table C), and the nozzle #52 (using the mask table D). In the fourth embodiment, dots which should be printed by the non-discharge nozzle #20 are complementarily printed using the three nozzles (#4, #36, and #52).

In order to complementarily print dots using a plurality of nozzles, control different from normal control is done for table data generation processing for the fifth line of the mask table A applied to the nozzle #4, the fifth line of the mask table C applied to the nozzle #36, and the fifth line of the mask table D applied to the nozzle #52. More specifically, in generating the table data from original table data, the fourth embodiment divides the original table data by not 4 in normal control but 3. Data "1" is generated for a dot position corresponding to a remainder "0" resulting from division by 3 for the fifth line of the mask table A. Similarly, data "1" is generated for a dot position corresponding to a remainder "1" resulting from division by 3 for the fifth line of the mask table C. Data "1" is generated for a dot position corresponding to a remainder "2" resulting from division by 3 for the fifth line of the mask table D. This processing can assign dots which should be printed by the non-discharge nozzle #20 to the three nozzles (nozzles #4, #36, and #52) capable of normal discharge. Even if a discharge error occurs in a nozzle, a normal image can be formed. All data of the fifth line of the mask table B corresponding to the non-discharge nozzle #20 are changed to "0" regardless of original mask table values so as to stop printing any dots.

FIGS. 16A to 16D show an example of mask tables generated with respect to the mask tables shown in FIGS. 3A to 3D when a discharge error is detected in the nozzle #20. The tables shown in FIGS. 16A to 16D cause the nozzles #4, #36, and #52 capable of normal discharge to complementarily print dots which should be printed by the non-discharge nozzle #20.

Mask table generation control executed in the fourth embodiment when a non-discharge nozzle is detected will be described with reference to FIGS. 15A and 15B.

Figure 15A:
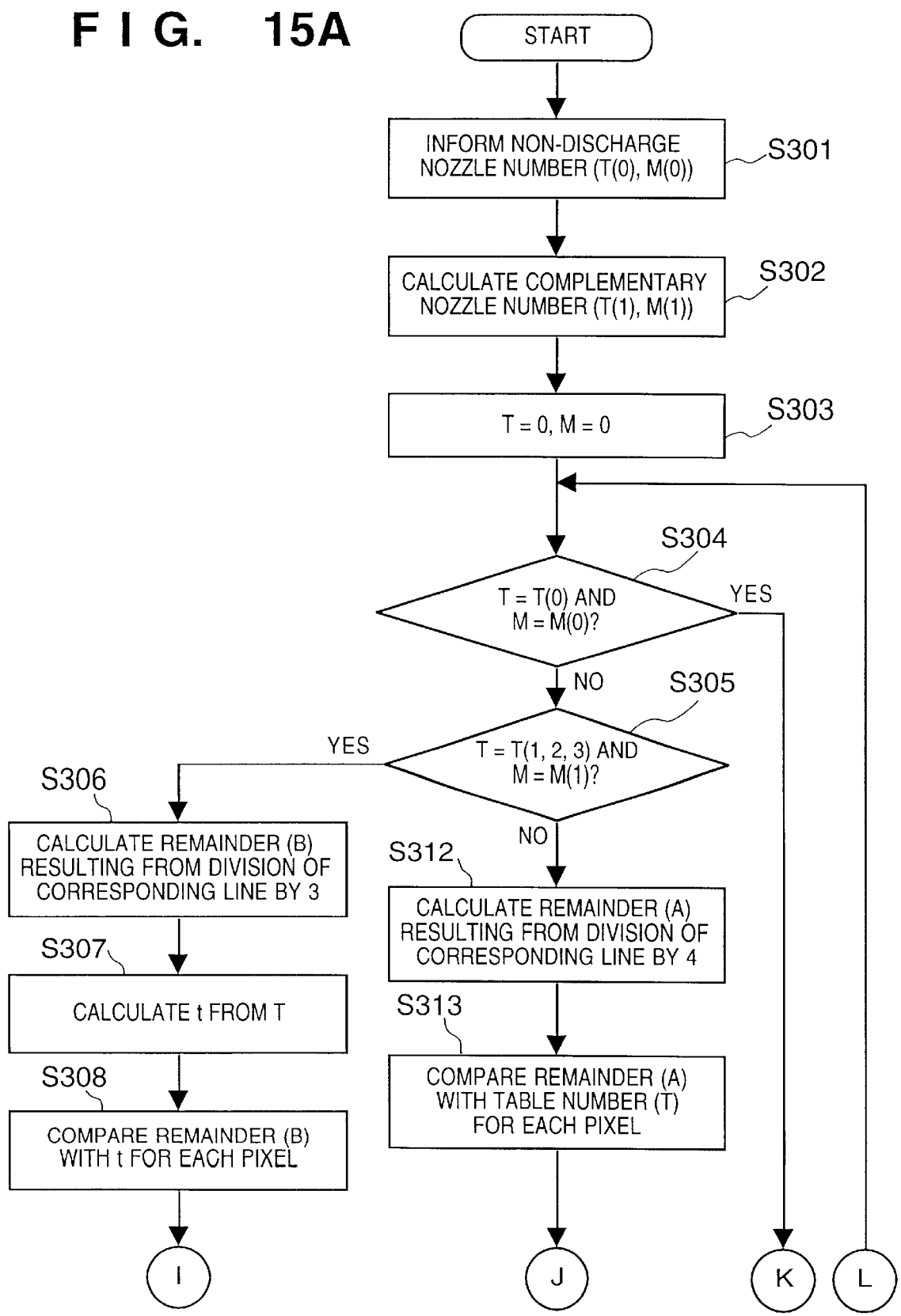
FIGS. 15A and 15B are flow charts showing mask table generation control according to the fourth embodiment of the present invention.
Figure 15B:
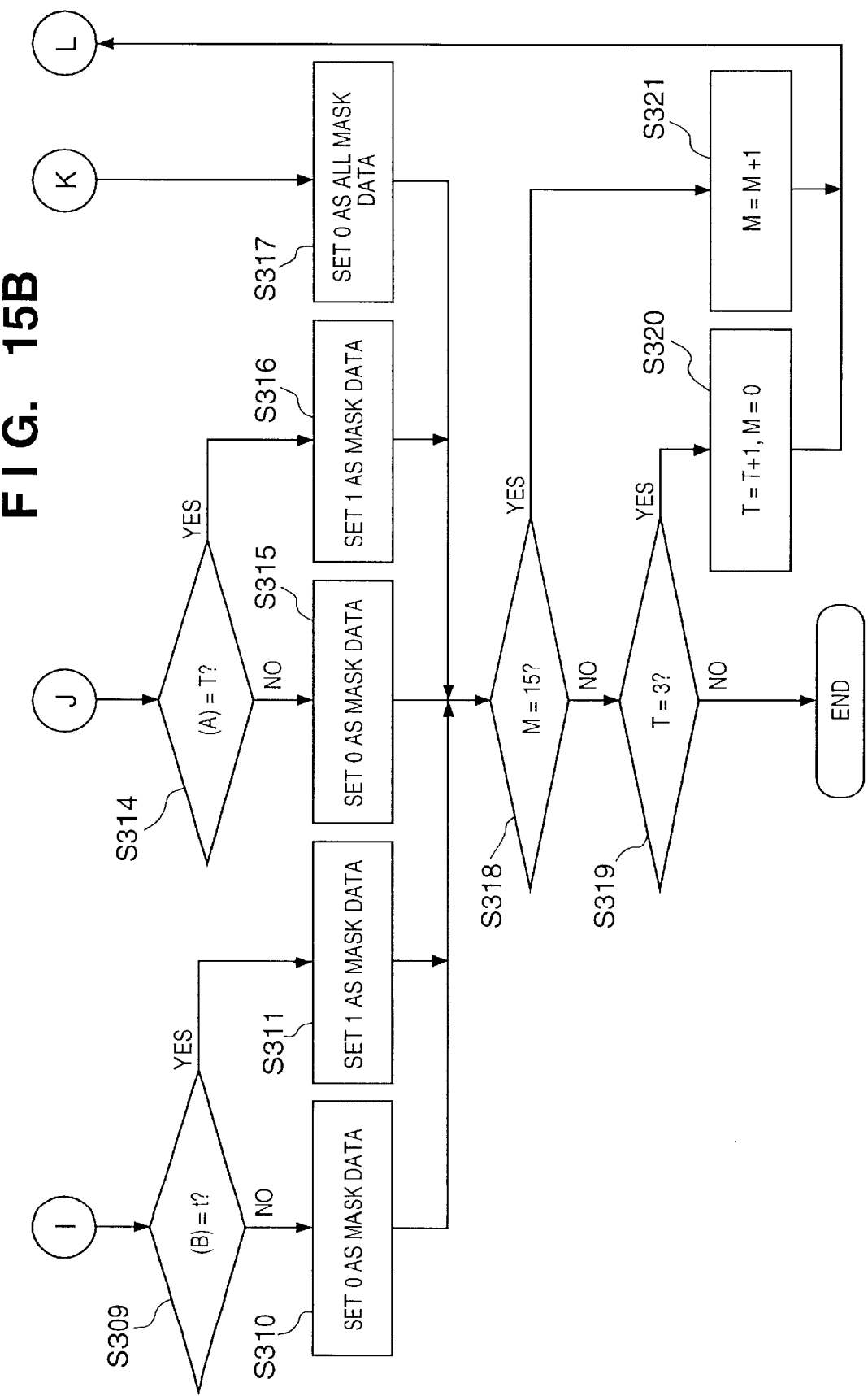

FIGS. 15A and 15B are flow charts showing mask table generation control in the fourth embodiment. Control not associated with a discharge error detection result (non-discharge nozzle) is the same as in the first embodiment described with reference to FIGS. 5A and 5B, and therefore will not be explained again here. It will be understood, however, that steps S301–S305 in FIG. 15A and steps S314–S321 in FIG. 15B correspond to steps S101–S105 in FIG. 5A and steps S113–S120 in FIG. 5B, respectively. Processing from steps S306 to S311 as the feature of the fourth embodiment will be explained in detail.

The above-mentioned embodiments use one nozzle for complimentary printing, whereas the fourth embodiment uses a plurality of nozzles for complimentary printing. Particularly the fourth embodiment performs complementary printing using all the three nozzles which can be used for complementary printing. Letting N(1), N(2), and N(3) be the nozzle numbers of the three complimentary printing nozzles, these nozzles can be expressed using corresponding table numbers and raster addresses by N(1)=16T(1)+M(1), N(2)=16T(2)+M(2), and N(3)=16T(3)+M(3). In the fourth embodiment, M(1)=M(2)=M(3).

In processing from steps S306 to S311, mask table data are generated in correspondence with dots in order to print dots corresponding to a non-discharge nozzle by other complementary nozzles.

As for table data (T=T(1), T(2), or T(3), M=M(1)) for the complimentary nozzles, 0, 1, and 2 are obtained as values t for T(1), T(2), and T(3). A remainder B resulting from division of the original table data by 3 is compared with t (step S308). If the remainder B coincides with t (YES) in step S308, "1" is generated; if NO in step 308, "0" is generated (steps S309, S310, and S311).

By this mask table generation processing, dots which should be printed by a non-discharge nozzle are assigned to and printed by a plurality of nozzles which form the same line by other scanning operations. Thus, image omission by a discharge error can be avoided to form a normal image.

As described above, according to the fourth embodiment, a nozzle in which a discharge error occurs is specified in the inkjet printing apparatus which performs multipath printing by the table thinning method. When a non-discharge nozzle is detected among a plurality of nozzles arranged on the printhead, mask table generation is partially changed to assign dots which should be printed by the non-discharge nozzle to a plurality of nozzles which form the same line by other scanning operations, thereby complementarily printing the dots. This allows continuing a normal printing function without exchanging the printhead. In other words, apparatus reliability can be improved without adding any large-scale specific circuit or the like, the apparent service life of the printhead can be prolonged, and an excellent, low-running-cost inkjet printing apparatus can be provided.

(Fifth Embodiment)

In the above embodiments, when a non-discharge nozzle is detected, complementary printing of forming, by another nozzle, dots which should be printed by the non-discharge nozzle is realized by, e.g., a change of generation processing, regeneration processing, or rewrite processing based on the original mask table.

In the fifth embodiment, complementary processing table data are prepared in advance. When a non-discharge nozzle exists, the complementary processing table data replace table data to change the table for complementary printing.

The basic operation and internal arrangement of an inkjet printing apparatus are the same as in the first embodiment except that the inkjet printing apparatus in the fifth embodiment further comprises a complementary nozzle table.

The feature of mask table replacement processing in the fifth embodiment when a discharge error occurs in a nozzle of the printhead will be explained in detail.

For example, a discharge error occurs in the nozzle #20 of 64 nozzles arranged on the printhead shown in FIG. 20. As described in the first embodiment, the nozzle #20 corresponds to the fifth line of the mask table B. When an image is formed by four scanning operations as shown in FIG. 4, the remaining nozzles which form dots on the same line as dots which should be printed by the nozzle #20 are three nozzles, i.e., the nozzle #4 (using the mask table A), the nozzle #36 (using the mask table C), and the nozzle #52 (using the mask table D). In the fifth embodiment, dots which should be printed by the non-discharge nozzle #20 are complementarily printed using the three nozzles (#4, #36, and #52).

In order to complementarily print dots using a plurality of nozzles, control different from normal control is done for table data generation processing for the fifth line of the mask table A applied to the nozzle #4, the fifth line of the mask table C applied to the nozzle #36, and the fifth line of the mask table D applied to the nozzle #52. The fifth embodiment adopts processing of replacing table data with the complementary mask table stored in the apparatus, instead of generating the table data from original table data.

FIG. 18 shows an example of the complementary mask table. The complementary mask table includes tables in units of lines prepared for three complementary nozzles in advance. As shown in FIG. 18, the complementary mask table includes tables K, L, and M. Data "1" are assigned to the tables K, L, and M at an almost constant ratio of ⅓ so as to form all dots which should be formed by a non-discharge nozzle, by complementary nozzles corresponding to the three line tables. The table K is used for the fifth line of the mask table A, the table L is used for the fifth line of the mask table C, and the table M is used for the fifth line of the mask table D. With this setting, dots which should be printed by the non-discharge nozzle #20 are assigned to and printed by the three nozzles (nozzles #4, #36, and #52) capable of normal ink discharge. Consequently, even if a discharge error occurs in a nozzle, a normal image can be formed. All data of the fifth line of the mask table B corresponding to the non-discharge nozzle #20 are changed to "0" regardless of original mask table values so as not to assign data "1" representing dot printing.

FIGS. 19A to 19D show an example of mask tables generated with respect to the mask tables shown in FIGS. 3A to 3D when a discharge error is detected in the nozzle #20. The tables shown in FIGS. 19A to 19D cause the nozzles #4, #36, and #52 capable of normal discharge to complementarily print dots which should be printed by the non-discharge nozzle #20.

Mask table generation control executed in the fifth embodiment when a discharge error occurs will be described with reference to FIGS. 17A and 17B.

Figure 17A:
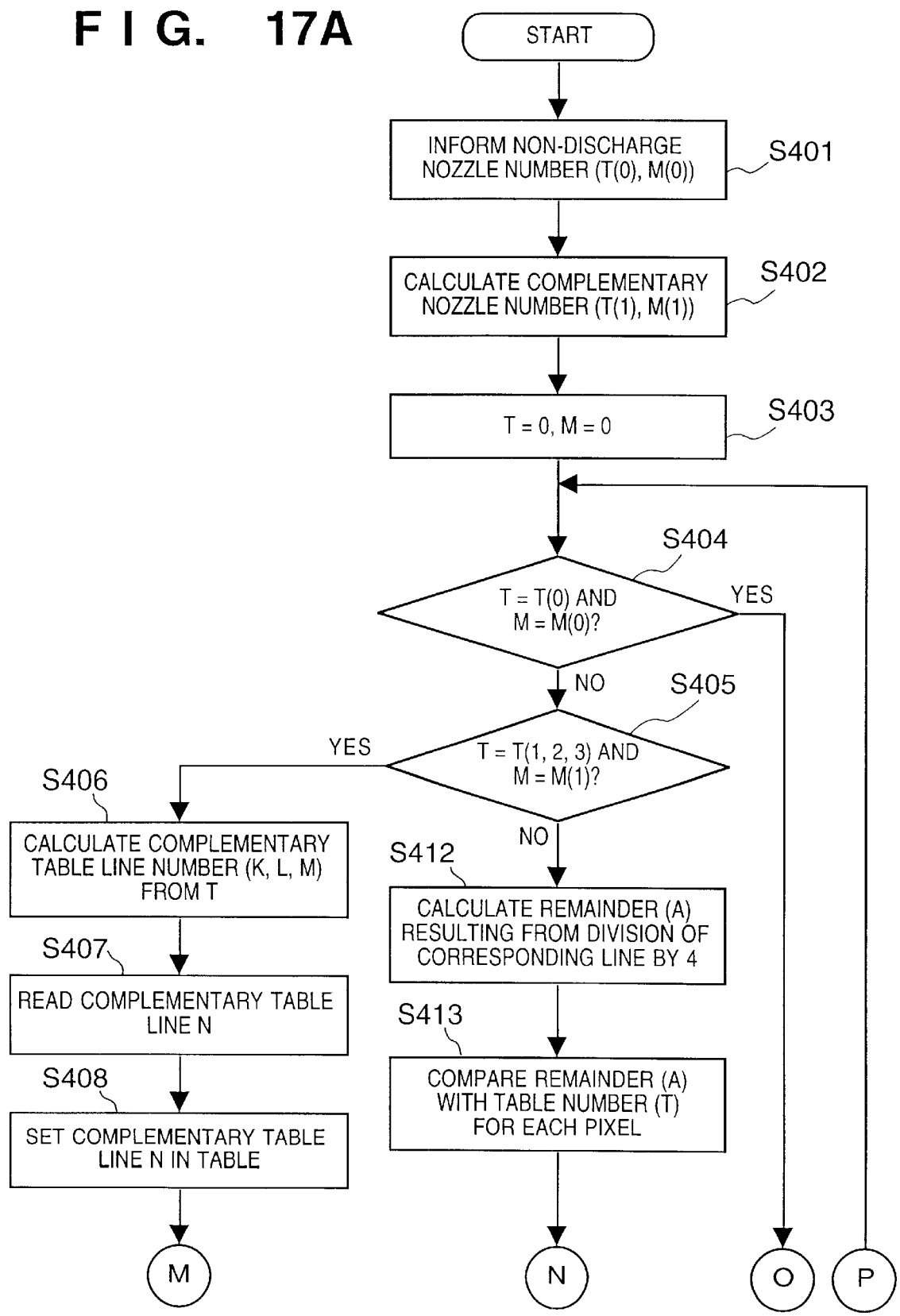

FIGS. 17A and 17B are flow charts showing mask table generation processing in the fifth embodiment of the present invention. Control not associated with a discharge error detection error detection result (non-discharge nozzle) is the same as in the first embodiment described with reference to FIGS. 5A and 5B, and therefore will not be explained again here. It will be understood, however, that steps S401–S405, S412 and S413 in FIG. 17A and steps S411–S418 in FIG. 17B correspond to steps S101–S105, S111 and S112 in FIG. 5A and steps S113–S120 in FIG. 5B, respectively, Processing from steps S406 to S408 as the feature of the fifth embodiment will be explained in detail.

In the fifth embodiment, when a discharge error occurs in one nozzle, dots on a line which should be formed by this nozzle are complementarily printed by a plurality of nozzles. Especially the fifth embodiment performs complementary printing using all nozzles which can be used for complementary printing.

Letting N(1), N(2), and N(3) be the numbers of the three complimentary nozzles, these nozzles can be expressed using corresponding table numbers and raster addresses by N(1)=16T(1)+M(1), N(2)=16T(2)+M(2), and N(3)=16T(3)+M(3). In the fifth embodiment, M(1)=M(2)=M(3). As for table data (T=T(1), T(2), or T(3), M=M(1)) for the complimentary nozzle, K, L, and M are obtained as complementary table line numbers N for T(1), T(2), and T(3) (step S406). Then, a complementary table as a table for one corresponding line is read out (step S407) and set as a mask table for the complementary nozzle (step S408).

By this mask table replacement processing, dots which should be printed by a non-discharge nozzle are assigned to a plurality of nozzles which form the same line by other scanning operations. Thus, image omission by the non-discharge nozzle can be avoided to form a normal image.

Note that in the fifth embodiment, a normal mask table is generated by arithmetic processing based on the original mask table. Alternatively, mask tables corresponding to respective printing paths (printing modes) may be prepared and selectively used. The mask table may be stored in the inkjet printing apparatus or transferred from an external processing apparatus such as a host computer prior to image information.

As described above, according to the fifth embodiment, a discharge error is detected for each nozzle in the inkjet printing apparatus which performs multipath printing by the table thinning method. When a discharge error is detected, the mask table is partially replaced with the complementary table to assign dots which should be printed by the non-discharge nozzle to nozzles which form the same line by other scanning operations, thereby complementarily printing the dots. This allows continuing a normal printing function without exchanging the printhead. In other words, apparatus reliability can be improved without adding any large-scale specific circuit or the like, the apparent service life of the printhead can be prolonged, and an excellent, low-running-cost inkjet printing apparatus can be provided.

(Sixth Embodiment)

In the above embodiments, a printing sheet is always conveyed by a constant amount every printhead scanning. Note that the sheet convey amount in the above embodiments corresponds to a width obtained by dividing the number of nozzles of the printhead by the number of printhead scanning operations (the number of printing paths) in a predetermined image area.

However, the present invention is not limited to the arrangements of the above embodiments, and can be applied to, e.g., an arrangement of performing multipath printing while changing the printing sheet convey amount of each printhead scanning every scanning operation. In this case, the complementary nozzle number is calculated in accordance with a sheet convey amount executed for each scanning.

Further, in the above embodiments, the printing resolution in the subscanning direction is equal to the nozzle resolution. In other words, in the above embodiments, the density of dots printed along the nozzle alignment direction of the printhead is equal to the density of a plurality of aligned nozzles. However, the present invention is not limited to this, and can be applied to a combination with so-called interlaced printing of forming an image at a printing resolution (the density of dots to be printed) an integer multiple of the nozzle resolution (the alignment density of nozzles). In this case, the method of the present invention is applied to thinning in the main scanning direction in a plurality of printing scanning operations for forming the same line.

(Seventh Embodiment)

In the above embodiments, raster-scanned binary image data is transferred from an external apparatus such as a host computer connected to the printing apparatus, and path data generation processing corresponding to multipath printing (non-discharge nozzle complementary processing based on this) is executed in the inkjet printing apparatus.

However, the present invention is not limited to this. For example, the above-described path data generation processing may be performed in an external processing apparatus such as a host computer to transfer the path data to the inkjet printing apparatus before the start of next scanning, and the inkjet printing apparatus may form an image based on the input path data. In this case, the present invention additionally adopts an arrangement of transferring a non-discharge nozzle position represented by a nozzle number or the like, and information about complementary control from the inkjet printing apparatus to the external processing apparatus in advance.

Note that the present invention suffices to specify a non-discharge nozzle, and is not particularly limited to a specific non-discharge nozzle detection method, specifying method, and the like. For example, the present invention can be applied to any one of the following arrangements. That is, a printed pattern may be read by a photosensor or the like incorporated in the printing apparatus to detect a discharge error from the result. The operation state of a discharge means incorporated in the printhead may be determined to detect a discharge error. A discharge error or non-discharge nozzle may be detected using an inspection apparatus other than the printing apparatus. Alternatively, a user may visually check a printed pattern and input a nozzle number determined as a non-discharge nozzle number.

The first, second, and third embodiments relate to the inkjet printing apparatus having a printhead constituted by a multi-printhead obtained by integrating four printheads corresponding four color inks. The present invention can also be applied to an inkjet printing apparatus having a multi-printhead constituted by an independent one-color head corresponding to each ink. The number of ink colors is not limited to four, a plurality of inks having different densities may be used, or the same ink may be overlapped. Further, the number of nozzles is not limited to 64.

Figure 10:
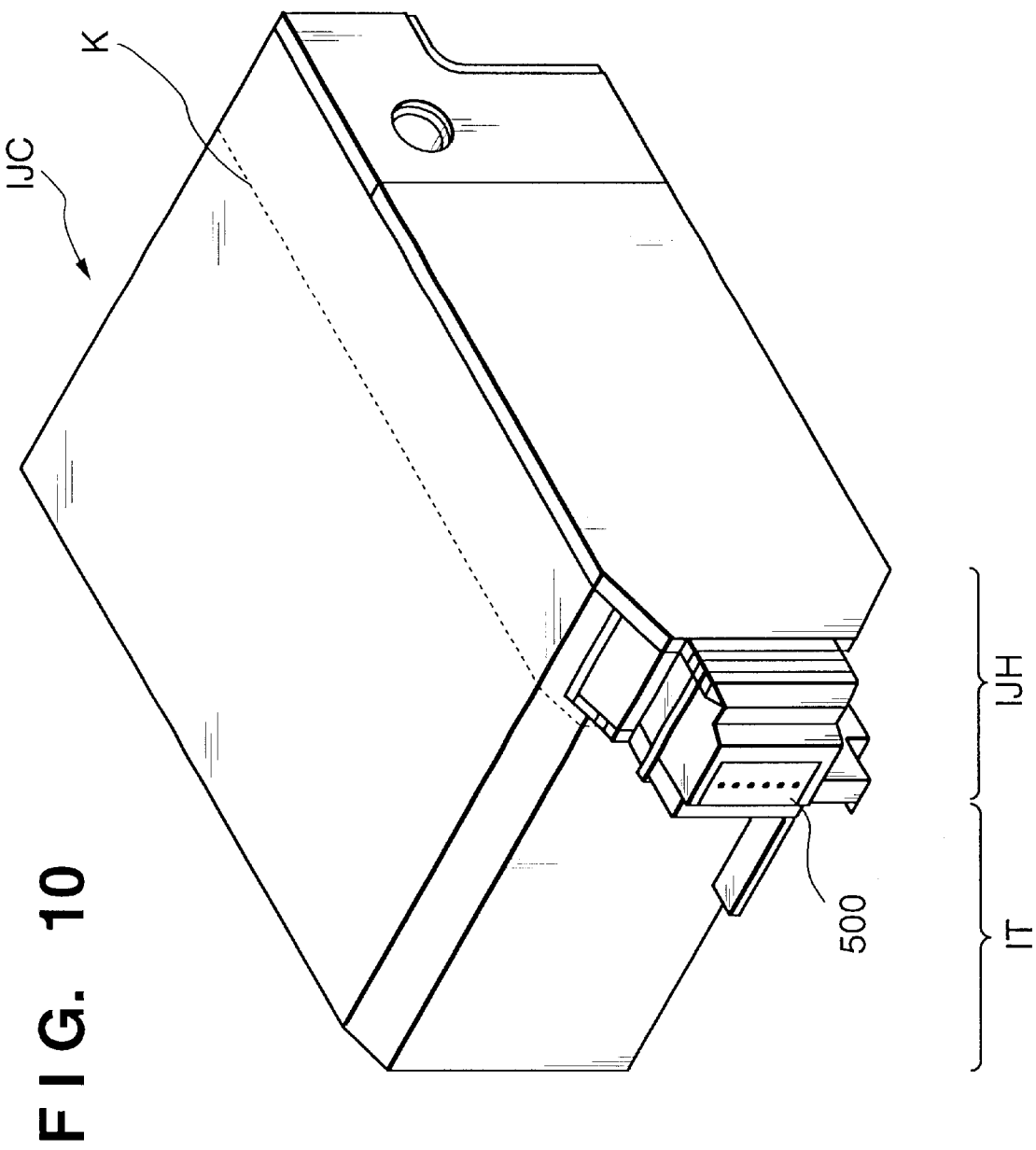
FIG. 10 is a perspective view showing an example of an ink cartridge IJC.
Figure 11:
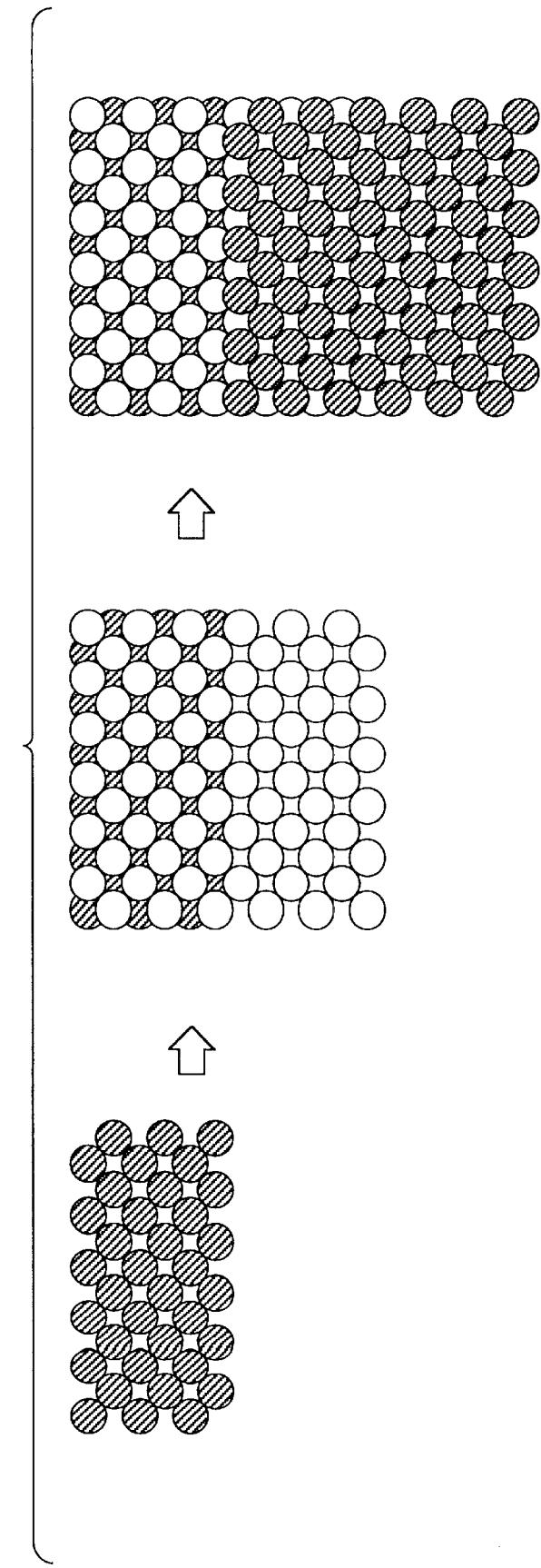
FIG. 11 is a view for explaining a conventional multipath printing method.

The printhead and ink tank are exchangeably integrated. Alternatively, they may be separably assembled to make it possible to exchange only the ink tank when ink is used up. FIG. 10 shows this example.

FIG. 10 is a perspective view showing the outer appearance of an ink cartridge IJC which can be disassembled into an ink tank and printhead.

As shown in FIG. 10, the ink cartridge IJC can be disassembled into an ink tank IT and printhead IJH at a boundary line K. The ink cartridge IJC has an electrode (not shown in FIG. 10) for receiving an electrical signal from a carriage (not shown in FIG. 10) when the ink cartridge IJC is mounted on the carriage. The carriage has features such as those of carriage 802 shown in FIG. 6. The ink cartridge IJC is driven by the electrical signal to discharge ink, as described above. In FIG. 10, reference numeral 500 denotes an ink orifice array. The ink tank IT has a fibrous or porous ink absorber in order to hold ink, and the ink absorber holds ink.

In the above description, ink is discharged from the printhead in the form of droplets, and the fluid contained in the ink tank is ink. However, the contained fluid is not limited to ink. For example, the ink tank may contain a processing solution discharged to a printing medium in order to enhance the fixation and water resistance of a printed image or improve the image quality.

In the above-described method, a mask table corresponding to 1,024 pixels*16 pixels is fixedly mapped in the main scanning direction and subscanning direction. Alternatively, for example, the mask table may be shifted by a predetermined amount in the main scanning direction every scanning. The table size is not limited to this, either.

In the second embodiment, the inkjet printing apparatus comprises the two printheads in the main scanning direction each of which is constituted by a multi-printhead obtained by integrating four printheads corresponding to the four color inks. Instead, the inkjet printing apparatus may comprise three or more printheads. The inkjet printing apparatus can be applied to various layouts.

The inkjet printing apparatus according to the present invention is not limited to one integrally or separately provided as an image output apparatus for an information processing apparatus such as a computer or wordprocessor, and may be a copying machine combined with a reader or a facsimile apparatus having a communication function.

The above embodiments comprise a means (e.g., an electrothermal converter or laser beam) for generating heat energy as energy used to discharge ink, and uses a method of changing the state of ink by the heat energy, among various ink-jet printing methods. Accordingly, a high-density, high-definition image can be printed.

As for the typical structure and principle, it is preferable to employ the basic principle disclosed in, for example, U.S. Pat. No. 4,723,129 or U.S. Pat. No. 4,740,796. The above method can be adapted to both a so-called on-demand type apparatus and a continuous type apparatus. In particular, a satisfactory effect can be obtained when the on-demand type apparatus is employed because of the structure arranged in such a manner that at least one drive signal, which rapidly raises the temperature of an electrothermal converter disposed to face a sheet or fluid passage which holds the fluid (ink) to a level higher than levels at which film boiling takes place are applied to the electrothermal converter in accordance with print information so as to generate heat energy in the electrothermal converter and to cause the heat effecting surface of the printhead to take place film boiling so that bubbles can be formed in the fluid (ink) to correspond to the one or more drive signals. The enlargement/contraction of the bubble will cause the fluid (ink) to be discharged through a discharging opening so that at least one droplet is formed. If a pulse drive signal is employed, the bubble can be enlarged/contracted immediately and properly, causing a further preferred effect to be obtained because the fluid (ink) can be discharged while revealing excellent responsibility.

It is preferable to employ a pulse drive signal disclosed in U.S. Pat. No. 4,463,359 or U.S. Pat. No. 4,345,262. If conditions disclosed in U.S. Pat. No. 4,313,124 which is an invention relating to the temperature rising ratio at the heat effecting surface are employed, a satisfactory printing result can be obtained.

As an alternative to the structure (linear fluid passage or perpendicular fluid passage) of the printhead disclosed in each of the above inventions and having an arrangement that the orifices, fluid passages, and electrothermal converters are combined, a structure having an arrangement that the heat effecting surface is disposed in a bent region and disclosed in U.S. Pat. No. 4,558,333 or U.S. Pat. No. 4,459,600 may be employed. In addition, the following structures may be employed: a structure having an arrangement that a common slit is formed to serve as an orifice of a plurality of electrothermal converters and disclosed in Japanese Patent Laid-Open No. 59-123670; and a structure disclosed in Japanese Patent Laid-Open No. 59-138461 in which an opening for absorbing pressure waves of heat energy is disposed to correspond to the orifice.

Furthermore, as a printhead of the full line type having a length corresponding to the maximum width of a printing medium which can be printed by the printing apparatus, either the construction which satisfies its length by a combination of a plurality of printheads as disclosed in the above specifications or the construction as a single full line type printhead which has integrally been formed can be used.

In addition, the invention is effective for a printhead of the freely exchangeable chip type which enables electrical connection to the apparatus main body or supply of ink from the apparatus main body by being mounted onto the apparatus main body, or for the case by use of a printhead of the cartridge type provided integrally on the printhead itself.

It is preferred to additionally employ a printhead restoring means and auxiliary means provided as the component of the above-described printing apparatus because printing operation can be further stabled. Specifically, it is preferable to employ a printhead capping means, cleaning means, pressurizing or suction means, electrothermal converter, another heating element or a sub-heating means constituted by combining them and a sub-discharge mode in which ink is discharged independently from printing operation in order to stabilize printing operation.

Further, the printing mode of the printing apparatus is not limited to a printing mode using only a major color such as black, but may include at least one of a printing mode using a plurality of different colors or a printing mode using full colors by color mixing, which can be implemented by integrating printheads or combining a plurality of printheads.

Although a fluid ink is employed in the above embodiments, an ink which is solidified at room temperature or lower, or an ink which is softened or liquefied at room temperature may be used. That is, any ink which is liquefied when a printing signal is supplied may be used because a general inkjet apparatus adjusts the temperature of the ink itself within the range of 30° C. or more to 70° C. or less to control the temperature so as to make the viscosity of the ink fall within a stable discharge range.

Furthermore, an ink which is solidified when it is caused to stand, and liquefied when heat energy is supplied can be adapted to positively prevent a temperature rise caused by heat energy by utilizing the temperature rise as energy of state transition from the solid state to the liquid state or to prevent ink evaporation. In any case, an ink which is liquefied when heat energy is supplied in accordance with a printing signal so as to be discharged in the form of fluid ink, or an ink which is liquefied only after heat energy is supplied, e.g., an ink which starts to solidify when it reaches a printing medium, can be adapted to the present invention. In the above case, the ink may be of a type which is held as fluid or solid material in a recess of a porous sheet or a through hole at a position to face the electrothermal converter as disclosed in Japanese Patent Laid-Open No. 54-56847 or No. 60-71260. It is the most preferred way for the ink to be adapted to the above film boiling method.

The present invention may be applied to a system constituted by a plurality of devices (e.g., a host computer, interface device, reader, and printer) or an apparatus comprising a single device (e.g., a copying machine or facsimile apparatus).

The object of the present invention is realized even by supplying a storage medium storing software program codes for realizing the functions of the above-described embodiments to a system or apparatus, and causing the computer (or a CPU or MPU) of the system or apparatus to read out and execute the program codes stored in the storage medium.

In this case, the program codes read out from the storage medium realize the functions of the above-described embodiments by themselves, and the storage medium storing the program codes constitutes the present invention.

As a storage medium for supplying the program codes, a floppy disk, hard disk, optical disk, magnetooptical disk, CD-ROM, CD-R, magnetic tape, nonvolatile memory card, ROM, or the like can be used.

The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

When the present invention is applied to the storage medium, this storage medium stores program codes corresponding to the above-described flow charts shown in FIGS. 5A, 5B, 8A and 8B.

As many apparently widely different embodiments of the present invention can be made without departing from the spirit and scope thereof, it is to be understood that the invention is not limited to the specific embodiments thereof except as defined in the appended claims.

What is claimed is:

1. A printing apparatus for printing an image on a printing medium using a printhead having a plurality of orifices arranged along a predetermined direction, comprising:

main scanning means for performing relative scanning with the printhead along a main scanning direction;

subscanning means for relatively moving the printing medium along a subscanning direction perpendicular to the main scanning direction;

printing control means for setting a relative moving amount of the printing medium by said subscanning means to be smaller than a width of an image corresponding to the plurality of orifices in the subscanning direction, and scanning a predetermined printing area of the printing medium with the printhead a plurality of times;

generation means for generating a mask table for outputting print data corresponding to each of a plurality of scanning operations;

specification means for specifying, from among the plurality of orifices, a discharge orifice having failure;

change means for changing contents of the mask table, generated by said generation means, in accordance with a position of the specified discharge orifice experiencing failure among the plurality of orifices, wherein, when a failure occurs at a predetermined orifice among the plurality of orifices, said change means changes the contents of the mask table generated by said generation means so as to print dots to be printed by the specified discharge orifice experiencing the failure according to the mask table generated by said generation means, using remaining main scannings except one main scanning for printing by the specified discharge orifice experiencing the failure in a plurality of main scannings by said printing control means; and output means for outputting print data corresponding to each of the plurality of orifices on the basis of image information corresponding to an image to be printed using the mask table, wherein said printing control means prints an image on the printing medium on the basis of print data output from said output means.

2. The apparatus according to claim 1, further comprising storage means for storing the mask table, wherein, when a failure occurs at a predetermined orifice among the plurality of orifices, said change means changes contents of a mask table corresponding to scanning including the predetermined orifice that is stored in said storage means.

3. The apparatus according to claim 1, wherein, when said specification means specifies a failure at a predetermined orifice during printing operation, said change means changes the contents of the mask table by regenerating a mask table corresponding to scanning including the predetermined orifice by said generation means.

4. The apparatus according to claim 1, comprising a plurality of printheads, wherein said generation means generates a mask table corresponding to each of the plurality of printheads.

5. The apparatus according to claim 1, wherein the printhead is an inkjet printhead for performing printing by discharging ink.

6. The apparatus according to claim 1, wherein the printhead discharges ink using heat energy and comprises a heat energy converter for generating heat energy to be supplied to ink.

7. A control method for a printing apparatus for printing an image on a printing medium using a printhead having a plurality of orifices arranged along a predetermined direction, comprising:

a generation step, of generating a mask table for outputting print data corresponding to the plurality of orifices;

a specification step, for specifying, from among the plurality of orifices, a discharge orifice experiencing failure;

a change step, of changing contents of the mask table in accordance with a position of the specified discharge orifice experiencing the failure among the plurality of orifices, wherein said change step comprises, when a failure occurs at a predetermined orifice among the plurality of orifices, changing the contents of the mask table generated in said generation step so as to print dots to be printed by the specified discharge orifice experiencing the failure according to the mask table generated in said generation step, using remaining main scannings except one main scanning for printing by the specified discharge orifice experiencing the failure in a plurality of main scannings in said printing control step;

an output step, of outputting print data for printing by scanning of the printhead in a main scanning direction that corresponds to each of the plurality of orifices, on the basis of image information corresponding to an image to be printed using the mask table; and a printing control step, of performing printing based on the print data output in said output step during relative scanning of the printhead along the main scanning direction, setting a relative moving amount of the printing medium in a subscanning direction after main scanning to be smaller than a width of an image corresponding to the plurality of orifices in the subscanning direction, and scanning a predetermined printing area of the printing medium with the printhead a plurality of times.

8. The method according to claim 7, further comprising a storage step, of storing the mask table in a storage medium, wherein, when a failure occurs at a predetermined orifice among the plurality of orifices, said change step includes changing contents of a mask table corresponding to scanning including the predetermined orifice that is stored in the storage medium in said storage step.

9. The method according to claim 7, wherein, when a failure is specified at a predetermined orifice in said specification step during printing operation, said change step includes changing the contents of the mask table by regenerating a mask table corresponding to scanning including the predetermined orifice in said generation step.

10. The method according to claim 7, wherein said printing apparatus comprises a plurality of printheads, and said generation step comprises generating a mask table corresponding to each of the plurality of printheads.

11. The method according to claim 7, wherein the printhead is an inkjet printhead for performing printing by discharging ink.

12. The method according to claim 11, wherein the printhead discharges ink using heat energy and comprises a heat energy converter for generating heat energy to be supplied to ink.

13. A computer-readable memory storing a control program for printing control of printing an image by scanning a predetermined printing area of a printing medium with a printhead a plurality of times in a printing apparatus for printing an image on a printing medium using a printhead having a plurality of orifices arranged along a predetermined direction, comprising:

a program code of a generation step, of generating a mask table for outputting print data corresponding to each of the plurality of orifices;

a program code of a specification step, for specifying, from among the plurality of orifices, a discharge orifice experiencing failure;

a program code of a change step, of changing contents of the mask table in accordance with a position of the specified discharge orifice experiencing the failure among the plurality of orifices, wherein said change step comprises, when a failure occurs at a predetermined orifice among the plurality of orifices, changing the contents of the mask table generated in said generation step so as to print dots to be printed by the specified discharge orifice experiencing the failure according to the mask table generated in said generation step, using remaining main scannings except one main scanning for printing by the specified discharge orifice experiencing the failure in a plurality of main scannings; and a program code of an output step of outputting print data for printing by scanning of the printhead in a main scanning direction that corresponds to each of the plurality of orifices, and on the basis of image information corresponding to an image to be printed using the mask table.

* * * * *

UNITED STATES PATENT AND TRADEMARK OFFICE
CERTIFICATE OF CORRECTION

PATENT NO. : 6,659,580 B2
DATED : December 9, 2003
INVENTOR(S) : Hiroki Horikoshi It is certified that error appears in the above-identified patent and that said Letters Patent is hereby corrected as shown below:

Column 1,
Line 18, "resent" should read -- recent --.

Column 8,
Line 47, "direction*32" should read -- direction x 32 --.

Column 11,
Line 50, 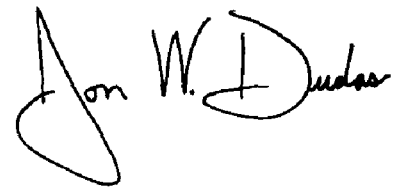

Column 13,
Line 4, "direction*32" should read -- direction x 32 --.

Column 21,
Line 33, "responding" should read -- responding to --; and
Line 67, "pixels*16" should read -- pixels x 16 --.

Column 23,
Line 17, "stabled" should read -- stabilized --.

Signed and Sealed this

Thirteenth Day of July, 2004

JON W. DUDAS
*Acting Director of the United States Patent and Trademark Office*